United States Patent
Hamid et al.

(10) Patent No.: US 11,777,214 B2
(45) Date of Patent: Oct. 3, 2023

(54) INTERLEAVED ANTENNA ARRAY CONFIGURATION IN A RADIO NODE

(71) Applicant: Telefonaktiebolaget LM Ericsson (publ), Stockholm (SE)

(72) Inventors: Mohamed Hamid, Malmö (SE); Christian Elgaard, Lund (SE); Ali Al-Qamaji, Gothenburg (SE); Fida Abdalrahman, Ar-Rass (SA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/913,597

(22) PCT Filed: Apr. 9, 2020

(86) PCT No.: PCT/EP2020/060116
§ 371 (c)(1),
(2) Date: Sep. 22, 2022

(87) PCT Pub. No.: WO2021/204386
PCT Pub. Date: Oct. 14, 2021

(65) Prior Publication Data
US 2023/0155290 A1    May 18, 2023

(51) Int. Cl.
*H01Q 5/40* (2015.01)
(52) U.S. Cl.
CPC .................... *H01Q 5/40* (2015.01)
(58) Field of Classification Search
CPC ... H01Q 5/40; H01Q 5/42; H04B 1/04; H04B 1/0475
See application file for complete search history.

(56) References Cited

U.S. PATENT DOCUMENTS

| 2012/0243447 A1* | 9/2012 | Weissman ............ H04B 1/0458 370/280 |
| 2013/0012144 A1* | 1/2013 | Besoli ...................... H01Q 1/36 455/84 |

(Continued)

FOREIGN PATENT DOCUMENTS

WO     2018001763 A1     1/2018

OTHER PUBLICATIONS

Abdelhafiz, et al., "A High-Performance Complexity Reduced Behavioral Model and Digital Predistorter for MIMO Systems With Crosstalk," IEEE Transactions on Communications, vol. 64, Issue 5, May 2016, pp. 1996-2004.

(Continued)

*Primary Examiner* — Jason Crawford
(74) *Attorney, Agent, or Firm* — Withrow & Terranova, PLLC

(57) ABSTRACT

An interleaved antenna array configuration in a radio node is disclosed. The antenna array includes a mixture of isolated and non-isolated antenna elements interleaved in each row and each column of the antenna array. Each isolated antenna element is only adjacent to one or two non-isolated antenna elements in each row and each column. Each non-isolated antenna element is only adjacent to one or two isolated antenna elements in each row and each column. By interleaving the isolated and non-isolated antenna elements in each row and column of the antenna array, it is possible to reduce a number of antenna isolators, thus helping to reduce cost and footprint of the radio node. Further, by using a combination of antenna isolators and simplified digital predistortion (DPD) actuators in association with the interleaved antenna array, the radio node is able to satisfy stringent radio frequency (RF) performance requirements.

20 Claims, 15 Drawing Sheets

(56) References Cited

U.S. PATENT DOCUMENTS

| | | | |
|---|---|---|---|
| 2017/0033915 A1* | 2/2017 | McCoy | H03F 1/3247 |
| 2018/0026586 A1* | 1/2018 | Carbone | H03F 1/0261 |
| | | | 330/124 R |
| 2018/0167092 A1* | 6/2018 | Hausmair | H04B 1/0483 |
| 2019/0199414 A1 | 6/2019 | Hogberg et al. | |
| 2019/0222181 A1* | 7/2019 | Khlat | H03F 3/189 |
| 2019/0372610 A1* | 12/2019 | Choi | H04B 1/0475 |
| 2022/0094058 A1* | 3/2022 | Tran | H01Q 21/28 |

OTHER PUBLICATIONS

Amin, et al. "Behavioral Modeling and Linearization of Crosstalk and Memory Effects in RF MIMO Transmitters," IEEE Transactions on Microwave Theory and Techniques, vol. 62, Issue 4, Apr. 2014, pp. 810-823.

Bassam, et al., "Crossover Digital Predistorter for the Compensation of Crosstalk and Nonlinearity in MIMO Transmitters," IEEE Transactions on Microwave Theory and Techniques, vol. 57, Issue 5, May 2009, pp. 1119-1128.

Hausmair, et al., "Digital Predistortion for Multi-Antenna Transmitters Affected by Antenna Crosstalk," IEEE Transactions on Microwave Theory and Techniques, vol. 66, Issue 3, Mar. 2018, pp. 1524-1535.

Luo, et al., "Interleaved Dual-band Circularly Polarized Active Array Antenna for Satellite Communications," 9th European Conference on Antennas and Propagation, Apr. 2015, 5 pages.

Marzetta, "Noncooperative Cellular Wireless with Unlimited Nos. of Base Station Antennas," IEEE Transactions on Wireless Communications, vol. 9, Issue 11, Nov. 2010, pp. 3590-3600.

Pozar, "Microwave Engineering," Fourth Edition, Section 9.4, 2012, Hoboken, New Jersey, John Wiley & Sons, Inc., pp. 475-482.

Pozar, "Microwave Engineering," Fourth Edition, Section 10.3, 2012, Hoboken, New Jersey, John Wiley & Sons, Inc., pp. 511-518.

Saffar, et al., "Behavioral Modeling of MIMO Nonlinear Systems With Multivariable Polynomials," IEEE Transactions an Microwave Theory and Techniques, vol. 59, Issue 11, Nov. 2011, pp. 2994-3003.

Shimura, et al., "Millimeter-Wave TX Phased Array with Phase Adjusting Function between Transmitters for Hybrid Beamforming with Interleaved Subarrays," 46th European Microwave Conference, Oct. 2016, European Microwave Association, pp. 1572-157.

International Search Report and Written Opinion for International Patent Application No. PCT/EP2020/060116, dated Oct. 28, 2020, 10 pages.

\* cited by examiner

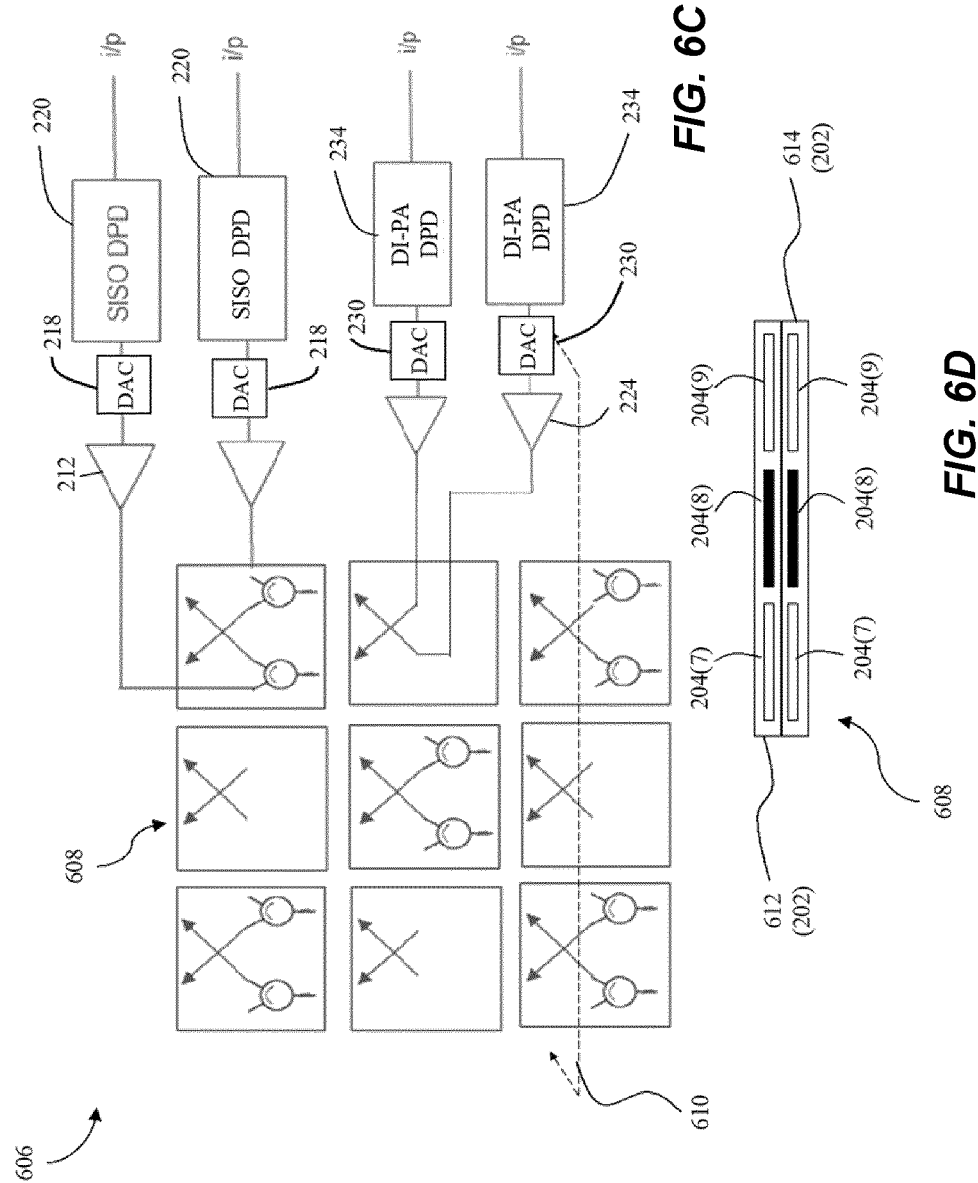

INTERLEAVED ANTENNA ARRAY CONFIGURATION IN A RADIO NODE

This application is a 35 U.S.C. § 371 national phase filing of International Application No. PCT/EP2020/060116, filed Apr. 9, 2020, the disclosure of which is incorporated herein by reference in its entirety.

TECHNICAL FIELD

The technology of the disclosure relates generally to configuring an antenna array having multiple antennas in a wireless communications network, such as a fifth generation new radio (5G-NR) cellular communications network.

BACKGROUND

Fifth generation new radio (5G-NR) is a new radio access technology (RAT) widely regarded as the next generation of RAT beyond the current third generation (3G) and fourth generation (4G) RATs. A 5G-NR radio node, such as an infrastructure base station (BS) or a user equipment (UE), can be configured to transmit a radio frequency (RF) signal(s) in a spectrum(s) that can be above or below 6 GHz. Given that some part of the spectrum(s) may be susceptible to interference and propagation loss, massive multiuser (MU) multiple-input multiple-output (MIMO) and spatial filtering (a.k.a., beamforming) are expected to be core technologies of the 5G-NR RAT for achieving high-bandwidth data transmission to multiple UEs.

In this regard, the 5G-NR radio node is commonly configured to utilize multiple antennas to radiate the RF signal(s) simultaneously. The multiple antennas are typically organized into an antenna array having multiple rows and columns (e.g., 4×4, 8×8, 16×16, etc.). The 5G-NR radio node may pre-code the RF signal(s) into multiple weighted RF signals, each having a respective weight corresponding to a respective one of the multiple antennas. In addition, the 5G-NR radio node typically employs a number of power amplifiers to amplify the weighted RF signals before feeding the amplified weighted RF signals to the multiple antennas via respective antenna paths.

The 5G-NR radio node may be required to simultaneously communicate with a large number of UEs via multiple RF channels in the mmWave spectrum(s). In addition, the 5G-NR radio node may need to co-exist and/or co-operate with conventional 3G and 4G radio nodes in a wireless communications cell. As such, the third-generation partnership project (3GPP) has established stringent RF performance requirements to help reduce interferences among RF channels and between different RATs. For example, 3GPP requires the 5G-NR radio node to limit adjacent channel leakage ratio (ACLR) to −45 dBc or below for mid-band transmitters operating in sub-6 GHz spectrum.

Notably, the power amplifiers can be inherently nonlinear. As a result, the amplified weighted RF signals may be distorted by the power amplifiers during amplification. In addition, the amplified weighted RF signals may be further distorted by the antenna paths connecting the power amplifiers to the antennas due to signal leakage (a.k.a. crosstalk) between the antenna paths. Thus, it may be desirable to reduce the nonlinearity distortion and the signal leakage in the 5G-NR radio node to satisfy the stringent 3GPP RF performance requirements.

SUMMARY

Embodiments disclosed herein include an interleaved antenna array configuration in a radio node. The antenna array includes a mixture of isolated and non-isolated antenna elements. The isolated antenna elements are each protected by a respective antenna isolator. In contrast, the non-isolated antenna elements are coupled to respective simplified digital pre-distortion (DPD) actuators (also referred to as "simplified DPD circuit" hereinafter) without respective antenna isolators. In examples discussed herein, the isolated and non-isolated antenna elements are interleaved in each row and each column of the antenna array. More specifically, each isolated antenna element is only adjacent to one or two non-isolated antenna elements in each row and each column. Likewise, each non-isolated antenna element is only adjacent to one or two isolated antenna elements in each row and each column. By interleaving the isolated and non-isolated antenna elements in each row and column of the antenna array, it is possible to reduce a number of antenna isolators, thus helping to reduce cost and footprint of the radio node. In addition, by using a combination of antenna isolators and simplified DPD circuits in association with the interleaved antenna array, the radio node is able to satisfy stringent radio frequency (RF) performance requirements, such as the RF performance requirements mandated by third-generation partnership project (3GPP) and/or regulatory authorities.

In one embodiment, a radio node is provided. The radio node includes an antenna array comprising a plurality of isolated antenna elements and a plurality of non-isolated antenna elements disposed in a first number of rows and a second number of columns. The plurality of isolated antenna elements and the plurality of non-isolated antenna elements are interleaved in each of the first number of rows and each of the second number of columns. The antenna array also includes a plurality antenna isolators each coupled to a respective one of the plurality of isolated antenna elements. The radio node also includes a plurality of non-isolated amplifier circuits each coupled to a respective one of the plurality of non-isolated antenna elements in the antenna array.

In another embodiment, a method for configuring an antenna array in a radio node is provided. The method includes disposing a plurality of isolated antenna elements and a plurality of non-isolated antenna elements in a first number of rows and a second number of columns of an antenna array such that the plurality of isolated antenna elements and the plurality of non-isolated antenna elements are interleaved in each of the first number of rows and each of the second number of columns. The method also includes coupling a plurality of antenna isolators to the plurality of isolated antenna elements in the antenna array, respectively. The method also includes coupling each of a plurality of non-isolated amplifier circuits to a respective one of the plurality of non-isolated antenna elements in the antenna array.

In another embodiment, a method for operating a radio node is provided. The radio node comprises an antenna array that comprises a plurality of isolated antenna elements and a plurality of non-isolated antenna elements that are interleaved in each row and each column. The method includes performing a first type of DPD to pre-distort a first digital signal. The method also includes converting the pre-distorted first digital signal into a first RF signal. The method also includes amplifying the first RF signal to generate a first amplified RF signal. The method also includes providing the first amplified RF signal to a respective one of the plurality of isolated antenna elements. The method also includes performing a second type of DPD to pre-distort a second digital signal. The method also includes converting the pre-distorted second digital signal into a second RF signal.

The method also includes amplifying the second RF signal to generate a second amplified RF signal. The method also includes providing the second amplified RF signal to a respective one of the plurality of non-isolated antenna elements.

In another embodiment, a radio node is provided. The radio node includes an antenna array includes a plurality of isolated sub-arrays and a plurality of non-isolated sub-arrays. The plurality of isolated sub-arrays and the plurality of non-isolated antenna sub-arrays are interleaved. The radio node also includes a plurality of antenna isolators each coupled to a respective one of the plurality of isolated sub-arrays. The radio node also includes a plurality of isolated amplifier circuits each coupled to a respective antenna isolator among the plurality of antenna isolators. The radio node also includes a plurality of non-isolated amplifier circuits each coupled to a respective one of the plurality of non-isolated sub-arrays in the antenna array.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 6C is a schematic diagram of an exemplary radio node including a dual-polarization antenna array that is formed by stacking two antenna arrays according to an alternative configuration;

FIG. 6D is an exemplary cross-section view of the dual-polarization antenna array in FIG. 6C;

DETAILED DESCRIPTION

Figure 1A:
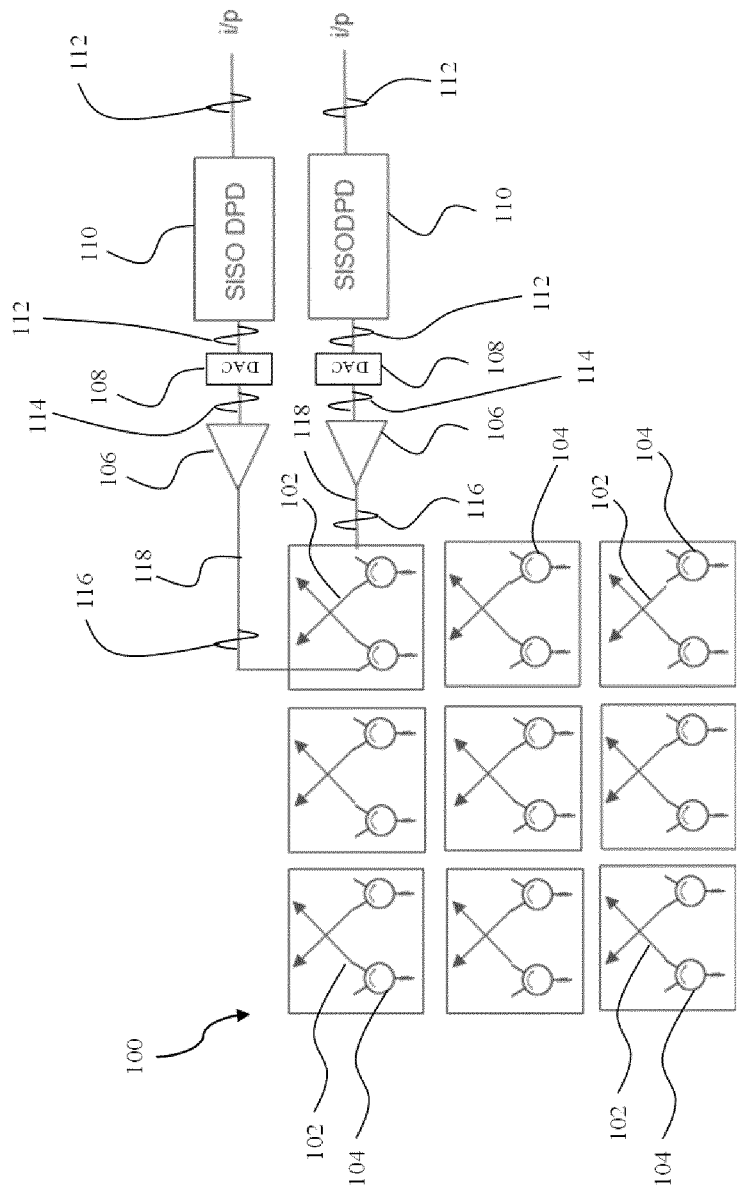
FIG. 1A is a schematic diagram of an exemplary existing isolator-protected antenna array in which each antenna element is coupled to and protected by a dedicated antenna isolator.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Embodiments disclosed herein include an interleaved antenna array configuration in a radio node. The antenna array includes a mixture of isolated and non-isolated antenna elements. The isolated antenna elements are each protected by a respective antenna isolator. In contrast, the non-isolated antenna elements are coupled to respective simplified digital pre-distortion (DPD) circuits without respective antenna isolators. In examples discussed herein, the isolated and non-isolated antenna elements are interleaved in each row and each column of the antenna array. More specifically, each isolated antenna element is only adjacent to one or two non-isolated antenna elements in each row and each column. Likewise, each non-isolated antenna element is only adjacent to one or two isolated antenna elements in each row and each column. By interleaving the isolated and non-isolated antenna elements in each row and column of the antenna array, it is possible to reduce the number of antenna isolators, thus helping to reduce cost and footprint of the radio node. In addition, by using a combination of antenna isolators and simplified DPD circuits in association with the interleaved antenna array, the radio node is able to satisfy stringent radio frequency (RF) performance requirements, such as the RF performance requirements mandated by 3GPP and/or regulatory authorities.

For the convenience of illustration and reference, a three-by-three (3×3) antenna array, which includes nine (9) antenna elements disposed in 3 rows and 3 columns, is used hereinafter as a non-limiting example. It should be appreciated that any configuration discussed hereinafter with reference to the 3×3 antenna array is generally applicable to any antenna array of any dimension.

Figures 1B, 1C:
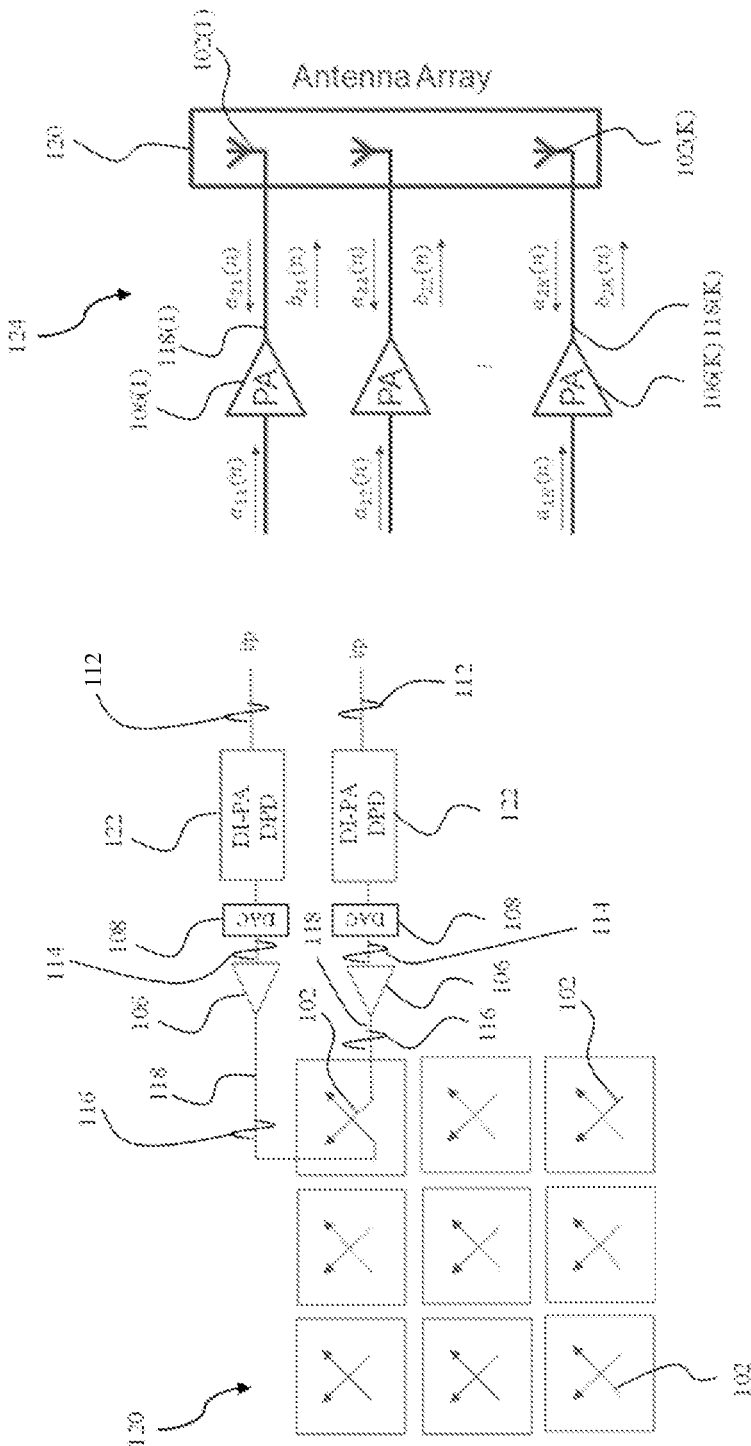
FIG. 1B is a schematic diagram of an exemplary existing isolator-free antenna array in which each antenna element is not coupled to and protected by a dedicated antenna isolator.
FIG. 1C is a schematic diagram providing an exemplary illustration of a dual-input power amplifier (DI-PA) model as described in U.S. Patent Application Publication Number 2018/0167092 A1 to Hausmair et al.
Figure 1D:
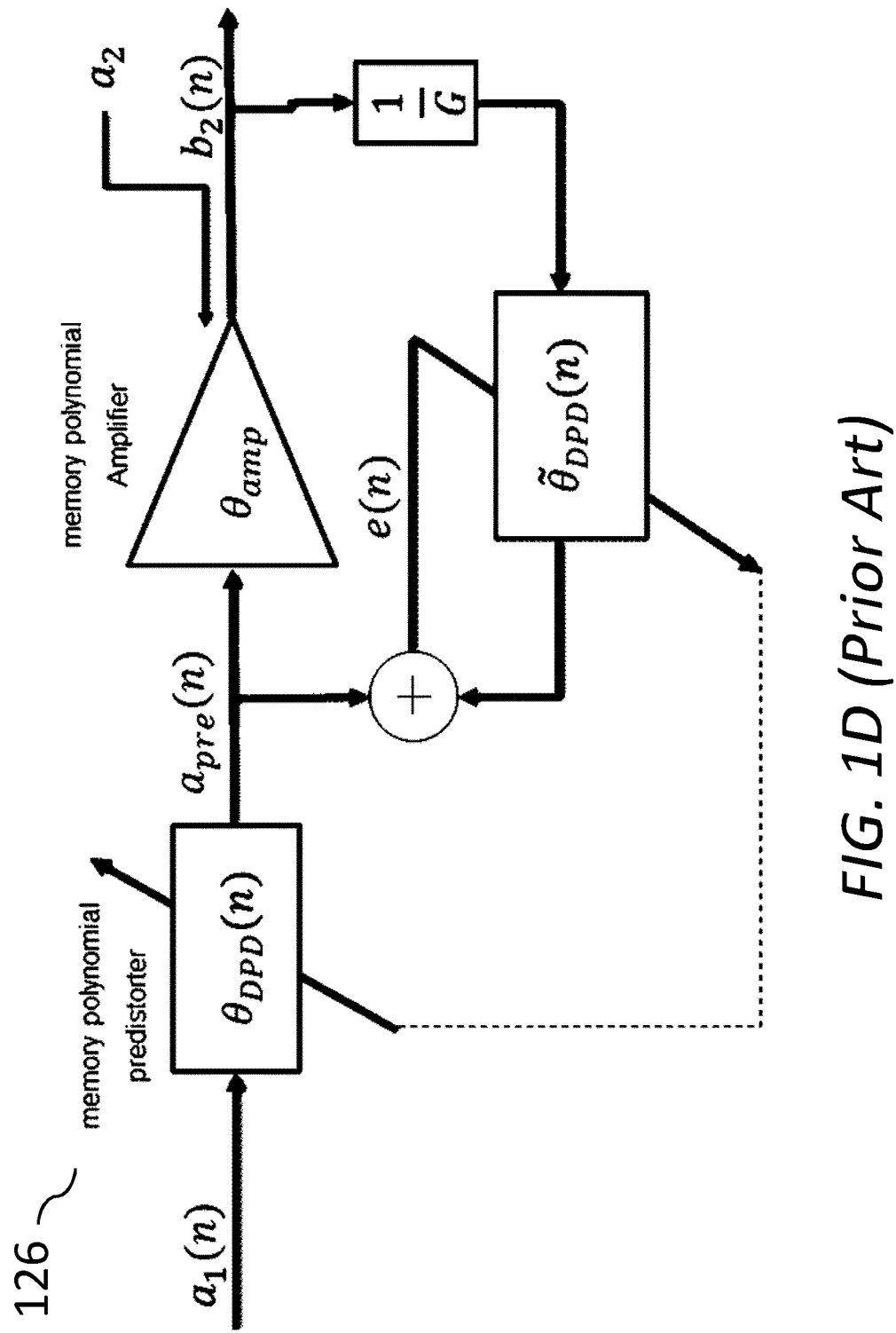
FIG. 1D is a schematic diagram providing an exemplary digital pre-distortion (DPD) block diagram for implementing DI-PA DPD based on the DI-PA model in FIG. 1C.
Figure 2A:
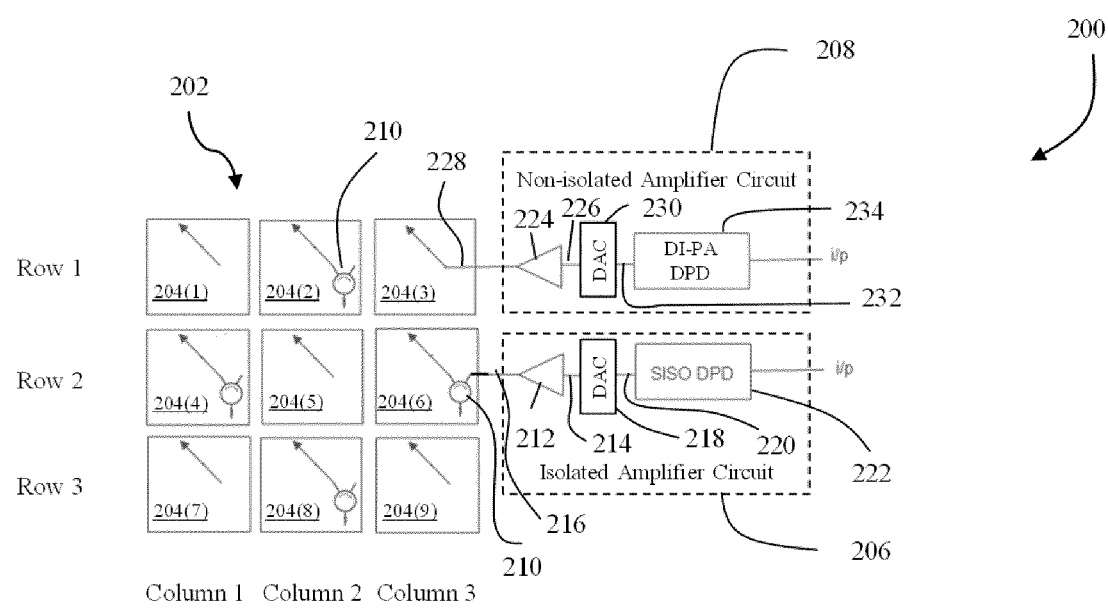
FIG. 2A is a schematic diagram of an exemplary radio node including an antenna array configured according to an interleaved configuration of the present disclosure.

Before discussing the interleaved antenna array configuration of the present disclosure, starting at FIG. 2A, a brief overview of some existing antenna array configurations is first provided with reference to FIGS. 1A-1D.

FIG. 1A is a schematic diagram of an exemplary existing isolator-protected antenna array 100 in which each antenna element 102 is coupled to and protected by a dedicated antenna isolator 104. In the isolator-protected antenna array 100, each antenna element 102 is coupled to a respective power amplifier 106, a respective digital-to-analog converter (DAC) 108, and a respective conventional DPD circuit 110 (denoted as Single-Input-Single-Output DPD or "SISO DPD"). Notably, only two power amplifiers 106, two DACs 108, and two conventional DPD circuits 110 are shown therein in FIG. 1A for the sake of brevity.

The DAC 108 is adapted to convert a digital signal 112 into an RF signal 114. The power amplifier 106 amplifies the RF signal 114 to generate an amplified RF signal 116. The amplified RF signal 116 is provided to a respective antenna element 102 via a respective antenna path 118.

As previously mentioned, the power amplifier 106 can be inherently nonlinear. As a result, the amplified RF signal 116 may be distorted by the power amplifier 106 during amplification. In addition, the amplified RF signal 116 may be further distorted along the antenna path 118 connecting the power amplifier 106 to the antenna element 102 due to signal leakage (a.k.a. crosstalk). As such, the isolator 104 is provided in the antenna path 118 in between the respective power amplifier 106 and the respective antenna element 102 to help reduce the distortion resulting from signal leakage (a.k.a. crosstalk). In addition, the conventional DPD circuit 110 can be configured to digitally pre-distort the digital signal 112 to help compensate for the nonlinearity distortion produced by the power amplifier 106. By employing the antenna isolator 104 and the conventional DPD circuit 110 to reduce crosstalk and nonlinearity distortion for each antenna element 102, the existing isolator-protected antenna array 100 may be able to satisfy the stringent RF performance requirements, such as adjacent channel leakage ratio (ACLR), mandated by the 3GPP and/or regulatory authorities.

However, given that the isolator-protected antenna array 100 may be scaled to include tens or even hundreds of the antenna elements 102, using a dedicated antenna isolator to protect each of the antenna elements 102 can cause significant cost and size increase of the isolator-protected antenna array 100. In addition, employing an excessive number of the antenna isolators 104 can also introduce significant insertion losses, which may cause a power loss in the amplified RF signals 116. Moreover, in a bandlimited device (e.g., the antenna isolators 104), the antenna isolators 104 may also distort wideband signals. Thus, it may be necessary to increase a power level of the RF signals 114 to help compensate for the power reduction caused by the insertion losses. As a result, the power amplifiers 106 can cause increased power consumption and heat dissipation in the existing isolator-protected antenna array 100.

To help mitigate the cost and size impact associated with the antenna isolators 104, FIG. 1B is a schematic diagram of an exemplary existing isolator-free antenna array 120 in which each antenna element 102 is not coupled to and protected by a dedicated antenna isolator. Common elements between FIGS. 1A and 1B are shown therein with common element numbers and will not be re-described herein.

As illustrated in FIG. 1B, in each antenna path 118, the power amplifier 106 is coupled to a respective one of the antenna elements 102 without employing the antenna isolator 104 in FIG. 1A. Instead, each antenna element 102 is coupled to a dual-input power amplifier (DI-PA) DPD circuit 122 that aims to reduce both the nonlinearity distortion caused by the power amplifier 106 and the crosstalk distortion association with the antenna path 118. The DI-PA DPD circuit 122 is configured to operate based on a DI-PA model that has been described in detail in U.S. Patent Application Publication Number 2018/0167092 A1 to Hausmair et al. (hereinafter "Hausmair").

In this regard, FIG. 1C is a schematic diagram providing an exemplary illustration of a DI-PA model 124 as described in Hausmair. Notably in FIG. 1C, the antenna element 102 in FIG. 1B is represented by antenna elements 102(1)-102(K), the power amplifier 106 in FIG. 1B is represented by power amplifiers 106(1)-106(K), and the antenna path 118 in FIG. 1B is represented by antenna paths 118(1)-118(K). In this regard, the antenna elements 102(1)-102(K) are coupled to the power amplifiers 106(1)-106(K) by the antenna paths 118(1)-118(K), respectively.

According to Hausmair, the DI-PA model 124 model includes two main blocks, namely a crosstalk and mismatch model (CTM) and a nonlinear dual-input DPD model. The CTM models the crosstalk and mismatch among the antenna paths 118(1)-118(K). In contrast, there is a respective nonlinear dual-input DPD model for each of the antenna paths 118(1)-118(K). Specifically, each of the power amplifiers 106(1)-116(K) may be modeled to have a direct DI-PA input $a_{1i}(n)$, a second DI-PA input $a_{2i}(n)$ (also referred to as an "indirect DI-PA input" hereinafter for the purpose of distinction), and a PA output $b_{2i}(n)$ ($1 \le i \le K$). The CTM is a function of the PA output $b_{2i}(n)$, which can be expressed as in equation (Eq. 1) below.

$$b_{2i}(n) = \sum_{m_1}^{M_1} \sum_{p=0}^{\frac{(P_1-1)}{2}} \alpha_{m_1}^{(2p+1)} a_{1i}(n-m_1)|a_{1i}(n-m_1)|^{2p} + \quad \text{(Eq. 1)}$$

$$\sum_{m_2=0}^{M_2} \beta_{0m_2}^{(1)} a_{2i}(n-m_2) +$$

$$\sum_{m_3=0}^{M_3} \sum_{m_3=0}^{M_4} \sum_{p=1}^{\frac{(P_2-1)}{2}} \beta_{m_4 m_3}^{(2p+1)} a_{2i}(n-m_3)|a_{1i}(n-m_4)|^{2p} +$$

$$\sum_{m_3=0}^{M_5} \sum_{m_3=0}^{M_6} \sum_{p=1}^{\frac{(P_3-1)}{2}} \gamma_{m_6 m_5}^{(2p+1)} a_{2i}^*(n-m_5)$$

$$(a_{1i}(n-m_6))^{p+1}(a_{1i}^*(n-m_6))^{p-1} +$$

$$\sum_{m_7=0}^{M_7} \sum_{m_8=0}^{M_8} \sum_{p=1}^{\frac{(P_4-1)}{2}} \sum_{v=0}^{p} \sum_{\substack{u=0 \\ u>1-v}}^{p+1} \delta_{u\,v\,m_8 m_7}^{(2p+1)} (a_{1i}(n-m_7))^{p+1-u}(a_{1i}^*(n-m_7))^{p-v} \times (a_{2i}(n-m_8))^u (a_{1i}^*(n-m_8))^v$$

In the equation (Eq. 1) above, $P_1 \ldots P_4$, $m_1 \ldots m_8$ represent different nonlinearity orders and memory depths for different terms, $\alpha$, $\beta$, $\gamma$, and $\delta$ are model coefficients corresponding to subscripted bases and indices. The PA output $b_{2i}(n)$ can also be expressed in a matrix form, as shown below in equation (Eq. 2).

$$b_2 = H(a_1, a_2)\theta \quad \text{(Eq. 2)}$$

In the equation (Eq. 2) above, $b_2$ is an output vector of a sufficiently large sample size, $a_1$ and $a_z$ are corresponding DI-PA model input vectors, H is a regression matrix accommodating different bases, and $\theta$ is the model parameters vector composed of concatenated $\alpha$, $\beta$, $\gamma$, and $\delta$ vectors. In a non-limiting example, $\theta$ can be determined based on a least square solution, as expressed below in equation (Eq. 3).

$$\theta = (H^H H)^{-1} H^H b_2 \quad \text{(Eq. 3)}$$

Notably, if each of the antenna paths 118(1)-118(K) is protected by a respective antenna isolator 104 in FIG. 1A, then the second DI-PA input $a_{2i}(n)$ will become zero (0). Accordingly, the PA output $b_{2i}(n)$ can be expressed by equation (Eq. 4) below.

$$b_{2i}(n) = \sum_{m_1}^{M_1} \sum_{p=0}^{\frac{(P_1-1)}{2}} \alpha_{m_1}^{(2p+1)} a_{1i}(n-m_1)|a_{1i}(n-m_1)|^{2p} \quad \text{(Eq. 4)}$$

The DI-PA DPD may be implemented based on a direct learning architecture, in which a post distorter is used as an estimate of a pre-distorter, for a linear gain G. In this regard, FIG. 1D is a schematic diagram providing an exemplary DPD block diagram 126 for implementing DI-PA DPD based on the DI-PA model in FIG. 1C. Herein, the DPD coefficients can be estimated based on equation (Eq. 5) below.

$$\hat{\theta}_{DPD} = \left(H\left(\frac{b_2}{G}, a_2\right)^H H\left(\frac{b_2}{G}, a_2\right)\right)^{-1} H\left(\frac{b_2}{G}, a_2\right) a_{pre} \quad \text{(Eq. 5)}$$

Again with $a_{pre}$ being the pre-distorted signal using the DPD coefficients estimated at previous iteration, if each of the antenna paths 118(1)-118(K) is protected by a respective antenna isolator 104 in FIG. 1A, then the DPD coefficients may be estimated based on equation (Eq. 6) below.

$$\hat{\theta}_{DPD} = \left(H\left(\frac{b_2}{G}\right)^H H\left(\frac{b_2}{G}\right)\right)^{-1} H\left(\frac{b_2}{G}\right) a_{pre} \quad \text{(Eq. 6)}$$

Notably, in the equation (Eq. 5), $a_2$ is not a dependent variable from $b_2$. In this regard, Hausmair proposes to estimate the CTM via an iterative process. Please refer to Hausmair for further details related to CTM estimation. It should be noted that mutual leakage among the antenna paths 118(1)-118(K) may lead to an increase in nonlinearity distortion. As a result, the existing isolator-free antenna array 120 may not be able to satisfy the stringent RF performance requirements mandated by the 3GPP.

As discussed above, the existing isolator-protected antenna array 100 in FIG. 1A may satisfy the stringent RF performance requirements at an expense of increased size and cost. In contrast, the existing isolator-free antenna array 120 in FIG. 1B may be implemented with a smaller size and cost compared to the existing isolator-protected antenna array 100 but may not be able to satisfy the stringent RF performance requirements mandated by the 3GPP. In this regard, it may be desirable to implement an antenna array with lower size and cost to satisfy the stringent RF performance requirements mandated by the 3GPP.

In this regard, FIG. 2A is a schematic diagram of an exemplary radio node 200 including an antenna array 202 configured according to an interleaved configuration of the present disclosure. As discussed in detail below, the antenna array 202 includes a mixture of isolated and non-isolated antenna elements. For the sake of distinction, an antenna element that is coupled to and protected by a dedicated antenna isolator in a respective antenna path (e.g., as in the existing isolator-protected antenna array 100 of FIG. 1A) is hereinafter referred to as an "isolated antenna element." In contrast, an antenna element that is not coupled to and not protected by a dedicated antenna isolator in a respective antenna path (e.g., as in the existing isolator-free antenna array 120 of FIG. 1B) is hereinafter referred to as a "non-isolated antenna element." By interleaving the isolated and non-isolated antenna elements in each row and each column of the antenna array 200, it is possible to reduce the number of antenna isolators, thus helping to reduce cost and footprint of the antenna array 200. In addition, by using a combination of antenna isolators and DI-PA DPD for some antenna elements in the antenna array 200 in an interleaved manner, it is possible to satisfy stringent radio RF performance requirements, such as the RF performance requirements mandated by the 3GPP. Further, by interleaving the isolated and non-isolated antenna elements, it may also be possible to reduce insertion losses caused by the antenna isolators, thus helping to reduce power consumption and heat dissipation in the radio node 200. Furthermore, it may also help to improve receive sensitivity of the antenna array 202 in a time-division duplexing (TDD) system, as an example.

In a non-limiting example, the antenna array 202 includes antenna elements 204(1)-204(9) that are disposed in a first number (M) of rows and a second number (N) of columns. In the specific example shown in FIG. 2A, the antenna elements 204(1)-204(9) are disposed in three (3) rows (M=3) and 3 columns (N=3). It should be appreciated that the antenna array 200 can include additional antenna elements and M can be equal to or different from N.

Among the antenna elements 204(1)-204(9), the antenna elements 204(2), 204(4), 204(6), and 204(8) are isolated antenna elements, while the antenna elements 204(1), 204(3), 204(5), 204(7), and 204(9) are non-isolated antenna elements. The isolated antenna elements are interleaved with the non-isolated antenna element in each of the first number of rows and each of the second number of columns.

For example, in row 1, the non-isolated antenna element 204(1) is adjacent to the isolated antenna element 204(2) only. In contrast, in row 2, the non-isolated antenna element 204(5) is adjacent to the isolated antenna elements 204(4) and 204(6). Likewise, in column 1, the non-isolated antenna element 204(1) is adjacent to the isolated antenna element 204(4) only. In contrast, in column 2, the non-isolated antenna element 204(5) is adjacent to the isolated antenna elements 204(2) and 204(8). In this regard, each non-isolated antenna element is said to be adjacent to a respective one or two of the isolated antenna elements in each of the first number of rows and each of the second number of columns. Likewise, each isolated antenna element is said to be adjacent to a respective one or two of the non-isolated antenna elements in each of the first number of rows and each of the second number of columns.

Each of the isolated antenna elements in the antenna array 202 is coupled to a respective isolated amplifier circuit 206. Similarly, each of the non-isolated antenna elements in the antenna array 202 is coupled to a respective non-isolated amplifier circuit 208. Although FIG. 2A only illustrates one isolated amplifier circuit 206 and one non-isolated amplifier circuit 208, it should be understandable that the radio node 200 includes an equal number of isolated amplifier circuits as the isolated antenna elements, and an equal number of non-isolated amplifier circuits as the non-isolated antenna elements. It should be further noted that the phrases "isolated antenna element," "non-isolated antenna element," "isolated amplifier circuit," and "non-isolated antenna circuit" are arbitrary terms for the purpose of distinction. These terms do not suggest how isolation is achieved in the radio node 200. In fact, isolation is an attribute of either a power amplifier or a whole TX-branch, which protects the power amplifier by isolating the power amplifier from reflected back waves by employing an isolator between the power amplifier and respective antenna element.

In a non-limiting example, the isolated amplifier circuit 206 includes an antenna isolator 210 coupled to a respective one of the isolated antenna elements 204(2), 204(4), 204(6), and 204(8) in the antenna array 202. The antenna isolator 210 is configured to isolate the respective isolated antenna element from mutual coupling (e.g., crosstalk) in the antenna array 202. Although the antenna isolator 210 is shown as being outside the isolated amplifier circuit 206, it should be appreciated that the antenna isolator 210 can be integrated with the isolated amplifier circuit 206.

The isolated amplifier circuit 206 includes an isolated power amplifier 212 coupled to the antenna isolator 210. The isolated power amplifier 212 is configured to amplify a respective RF signal 214 (also referred to as "first RF signal" hereinafter") to generate a respective amplified RF signal 216 (also referred to as "first amplified RF signal" hereinafter). The isolated amplifier circuit 206 also includes a DAC 218 coupled to the isolated power amplifier 212. The DAC 218 is configured to convert a respective digital signal 220 (also referred to as "first digital signal" hereinafter) into the RF signal 214. The isolated amplifier circuit 206 also includes a DPD circuit 222 (denoted as "SISO DPD") coupled to the DAC 218. The DPD circuit 222 is configured to digitally pre-distort the digital signal 220 to reduce nonlinearity distortion caused by the isolated power amplifier 212 in the amplified RF signal 216.

In another non-limiting example, the non-isolated amplifier circuit 208 includes a non-isolated power amplifier 224 coupled to a respective one of the non-isolated antenna elements in the antenna array 202. The non-isolated power amplifier 224 is configured to amplify a respective RF signal 226 (also referred to as "second RF signal" hereinafter) to generate a respective amplified RF signal 228 (also referred to as "second amplified RF signal" hereinafter). The non-isolated amplifier circuit 208 also includes a DAC 230 coupled to the non-isolated power amplifier 224. The DAC 230 is configured to convert a respective digital signal 232 (also referred to as "second digital signal" hereinafter) into the respective RF signal 226. The non-isolated amplifier circuit 208 also includes a simplified DPD actuator 234 (denoted as "DI-PA DPD") coupled to the DAC 230. The simplified DPD circuit 234 is configured to pre-distort the digital signal 232 based on a simplified DI-PA DPD algorithm to reduce nonlinearity distortion caused by the non-isolated power amplifier 224 in the amplified RF signal 228. In a non-limiting example, the simplified DPD actuator 234 is a physical circuit, such as a field-programmable gate array (FPGA) that implements the simplified DI-PA DPD algorithm. In this regard, the simplified DPD actuator 234 is referred interchangeably as "simplified DPD circuit" hereinafter.

The simplified DI-PA DPD algorithm disclosed herein may be seen as a simplification of the DI-PA DPD model described in Hausmair. Specifically, the simplified DI-PA DPD algorithm capitalizes on the fact that, as a result of interleaving the isolated antenna elements and the non-isolated antenna elements in the antenna array 200, each non-isolated antenna element is adjacent to up to four (4) isolated antenna elements in the antenna array 202.

Figure 3C:
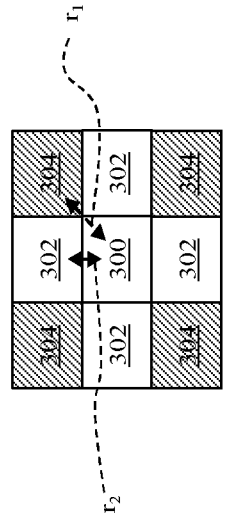
FIGS. 3A-3C are schematic diagrams providing exemplary illustrations of a non-isolated antenna element that may be surrounded by up to four isolated antenna elements in the antenna array of FIG. 2A.
Figure 3B:
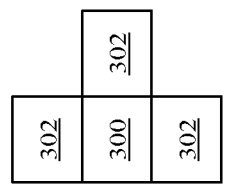
Figure 3A:
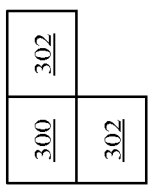

FIGS. 3A-3C are schematic diagrams providing exemplary illustrations of a non-isolated antenna element 300 that may be surrounded by up to 4 isolated antenna elements 302 in the antenna array 202 of FIG. 2A. Herein, the non-isolated antenna element 300 can be any one of the non-isolated antenna elements 204(1), 204(3), 204(5), 204(7), and 204(9) and the isolated antenna element 302 can be any one of the isolated antenna elements 204(2), 204(4), 204(6), and 204(8) in FIG. 2A.

FIG. 3A illustrates a scenario wherein the non-isolated antenna element 300 is surrounded by two isolated antenna elements 302. For example, the non-isolated antenna element 300 can be the non-isolated antenna element 204(1) in FIG. 2A, surrounded by the isolated antenna elements 204(2) and 204(4). In this regard, the two isolated antenna elements 302 are said to be immediately surrounding the non-isolated antenna 300.

FIG. 3B illustrates a scenario wherein the non-isolated antenna element 300 is surrounded by three isolated antenna elements 302. For example, the non-isolated antenna element 300 can be disposed on a first column in the antenna array 204 of FIG. 2A (not shown). In this regard, the three isolated antenna elements 302 are said to be immediately surrounding the non-isolated antenna element 300.

FIG. 3C illustrates a scenario wherein the non-isolated antenna element 300 is surrounded by four isolated antenna elements 302. For example, the non-isolated antenna element 300 can be the non-isolated antenna element 204(5) in FIG. 2A, surrounded by the isolated antenna elements 204(2), 204(4), 204(6), and 204(8). In this regard, the four isolated antenna elements 302 are said to be immediately surrounding the non-isolated antenna element 300.

The non-isolated antenna element 300 is also surrounded by some other non-isolated antenna elements 304. For example, the non-isolated antenna element 204(5) in FIG. 2A is surrounded by the non-isolated antenna elements 204(1), 204(3), 204(7), and 204(9). Unlike the immediately surrounding isolated antenna elements 302, the non-isolated antenna elements 304 are said to diagonally surround the non-isolated antenna element 300. Notably, the energy in a near field of the non-isolated antenna element 300 is proportional to $1/r^2$, wherein r represents a physical distance from an antenna element. As such, each of the non-isolated antenna elements 304 has a respective coupling distance $r_1$ to the non-isolated antenna element 300 that is $2^{0.5}$ longer than a respective coupling distance $r_2$ between each of the isolated antenna elements 302 and the non-isolated antenna element 300. As a result, the effective coupling between the non-isolated antenna element 300 and each of the isolated antenna elements 302 is approximately 3 dB lower that the effective coupling between the non-isolated antenna element 300 and each of the non-isolated antenna elements 304.

With reference back to FIG. 2A, given that each of the non-isolated antenna elements in the antenna array 202 is only surrounded by up to four isolated antenna elements, the indirect DI-PA input $a_{2i}(n)$ in the DI-PA DPD model (as shown in FIG. 1D) becomes a function of up to four isolated antenna elements immediately surrounding a respective one of the non-isolated antenna elements coupled to the non-isolated power amplifier 224. For example, in FIG. 3A, the indirect DI-PA input $a_{2i}(n)$ for a respective non-isolated power amplifier 224 coupled to the non-isolated antenna element 300 is a function of the two isolated antenna elements 300 immediately surrounding the non-isolated antenna element 300. Similarly, in FIG. 3B, the indirect DI-PA input $a_{2i}(n)$ for a respective non-isolated power amplifier 224 coupled to the non-isolated antenna element 300 is a function of the three isolated antenna elements 300 immediately surrounding the non-isolated antenna element 300. Likewise, in FIG. 3C, the indirect DI-PA input $a_{2i}(n)$ for a respective non-isolated power amplifier 224 coupled to the non-isolated antenna element 300 is a function of the four isolated antenna elements 302 immediately surrounding the non-isolated antenna element 300. Accordingly, the indirect DI-PA input $a_{2i}(n)$ may be generalized as in equation (Eq. 7) below.

$$a_{2i} = \Sigma_{k \in x} \lambda_{ik} b_{2k} \qquad (Eq. 7)$$

In the equation (Eq. 7) above, $\lambda_{ik}$ represents a respective coupling between an $i^{th}$ (e.g., the respective antenna path coupled to the non-isolated antenna element 300) and a $k^{th}$ antenna path (e.g., a respective antenna path coupled to any one of the isolated antenna elements 302), $b_{2k}$ represents an output of the $k^{th}$ antenna path, and the set x includes the up to four isolated antenna elements 302 immediately surrounding the non-isolated antenna element 300, as illustrated in FIGS. 3A-3C. As previously mentioned in FIG. 3C, the effective coupling between the non-isolated antenna element 300 and each of the isolated antenna elements 302 is approximately 3 dB lower that the effective coupling between the non-isolated antenna element 300 and each of the non-isolated antenna elements 304. As such, it may be possible to ignore the couplings between the non-isolated antenna element 300 and the non-isolated antenna elements 304. As a result, $b_{2k}$ becomes independent from the indirect DI-PA input $a_{2i}(n)$. Hence, the indirect DI-PA input $a_{2i}(n)$ can be determined in a single step process.

Figure 2B:
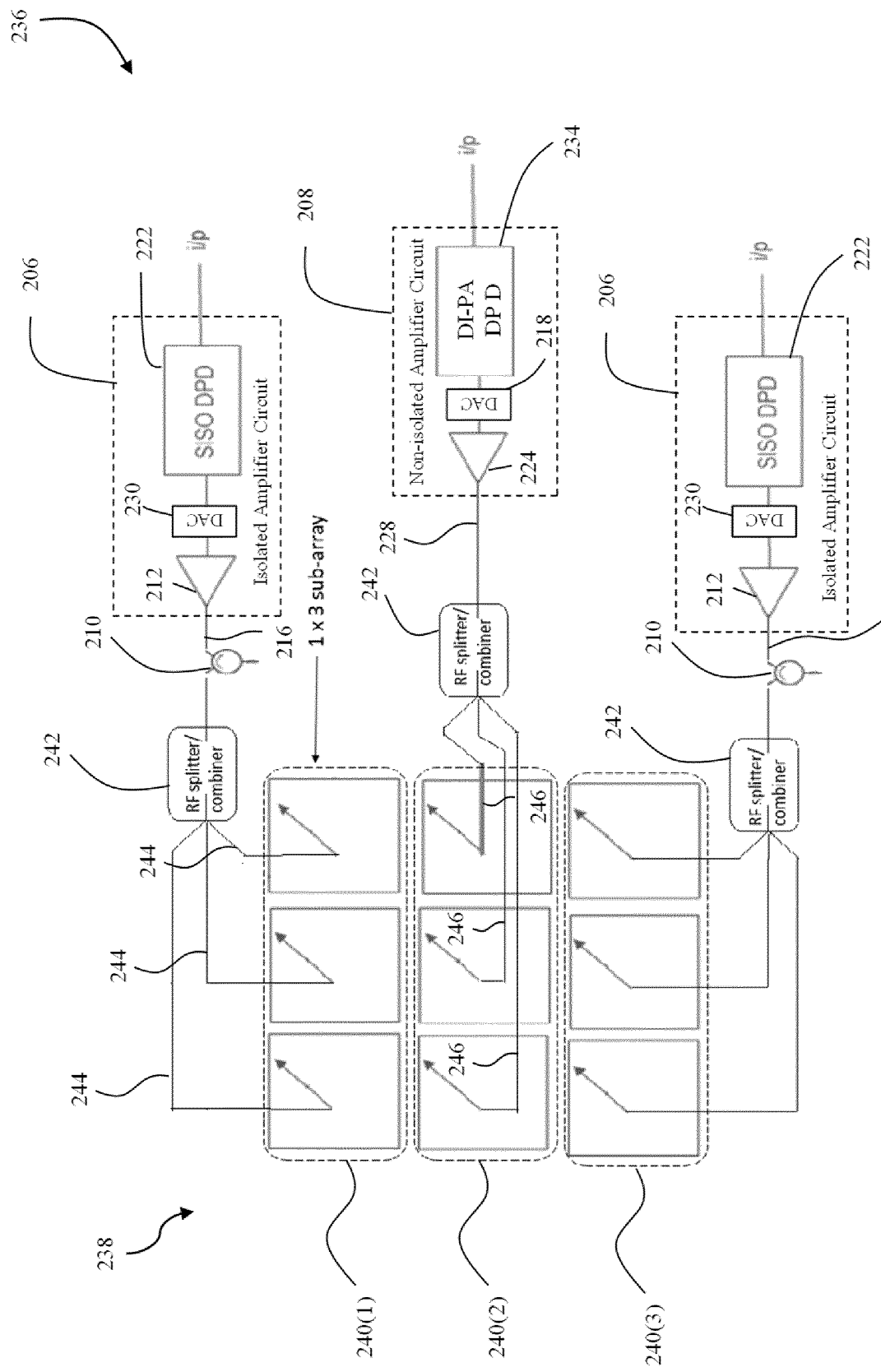
FIG. 2B is a schematic diagram of an exemplary radio node including an antenna array configured according to another interleaved configuration of the present disclosure.

FIG. 2B is a schematic diagram of an exemplary radio node 236 including an antenna array 238 configured according to another interleaved configuration of the present disclosure. Common elements between FIGS. 2A and 2B are shown therein with common element numbers and will not be re-described herein.

The antenna array 238 includes a plurality of isolated sub-arrays 240(1), 240(3) and a plurality of non-isolated sub-arrays 240(2). Although the antenna array 238 is shown to only include two isolated sub-arrays 240(1), 240(3) and one non-isolated sub-array 240(2), it should be appreciated that the antenna array 238 can include additional number of isolated sub-arrays and/or non-isolated sub-arrays.

Each of the isolated sub-arrays 240(1), 240(3) can include a plurality of isolated antenna elements, such as any of the isolated antenna elements 204(2), 204(4), 204(6), 204(8) in FIG. 2A. Similarly, each of the non-isolated sub-arrays 240(2) can include a plurality of isolated antenna elements, such as any of the non-isolated antenna elements 204(1), 204(3), 204(5), 204(7), 204(9) in FIG. 2A.

The radio node 236 can include a plurality of RF splitter/combiners 242 each coupled to a respective one of the isolated sub-arrays 240(1), 240(3) and the non-isolated sub-arrays 240(2). In a non-limiting example, each of the RF splitter/combiners 242 splits a respective amplified RF signal among the first amplified RF signal 216 and the second amplified RF signal 228. For example, the RF splitter/combiners 242 coupled to the isolated sub-array 240(1) splits the first amplified RF signal 216 into a plurality of first split RF signals 244 and provides the first split RF signals 244 to each isolated antenna element in the isolated sub-array 240(1). Similarly, the RF splitter/combiners 242 coupled to the non-isolated sub-array 240(2) splits the second amplified RF signal 228 into a plurality of second split RF signals 246 and provides the second split RF signals 246 to each non-isolated antenna element in the non-isolated sub-array 240(2).

As shown in FIG. 2B, each of the antenna isolators 210 is coupled to a respective one of the isolated sub-arrays 240(1), 240(3) via a respective one of the RF splitter/combiners 242 and each of the isolated amplifier circuits 206 is coupled to a respective one of the antenna isolators 210. In contrast, each of the non-isolated amplifier circuits 208 is coupled to a respective one of the RF splitter/combiners 242 without employing the antenna isolator 210.

Figures 4A, 4B:
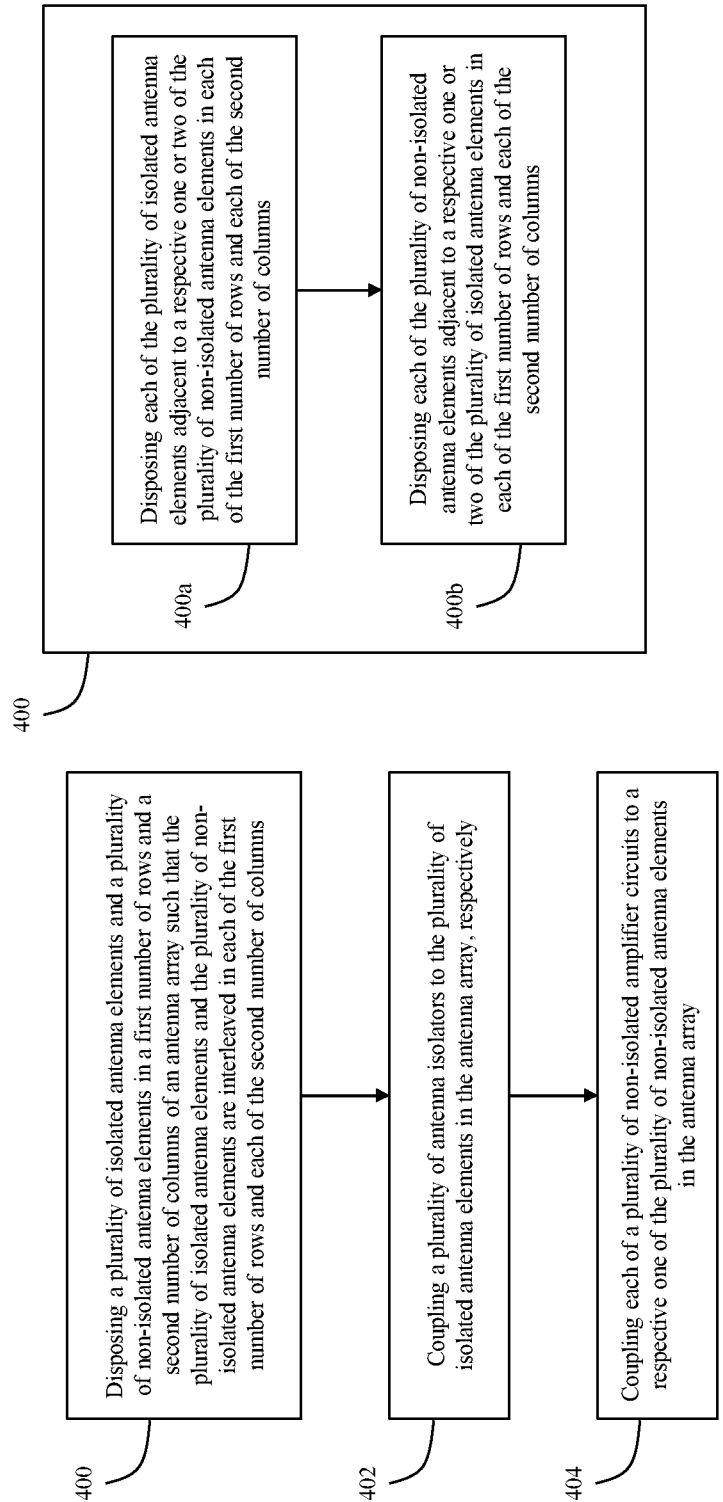
FIGS. 4A-4B are flowcharts illustrating an exemplary method for configuring the antenna array in the radio node of FIG. 2A.

FIGS. 4A and 4B are flowcharts illustrating an exemplary method for configuring the antenna array 202 in the radio node 200 of FIG. 2A. The method includes disposing a plurality of isolated antenna elements 204(2), 204(4), 204(6), and 204(8) and a plurality of non-isolated antenna elements 204(1), 204(3), 204(5), 204(7), and 204(9) in a first number (M) of rows and a second number (N) of columns in the antenna array 202 such that the isolated antenna elements 204(2), 204(4), 204(6), and 204(8) and the non-isolated antenna elements 204(1), 204(3), 204(5), 204(7), and 204(9) are interleaved in each of the first number (M) of rows and each of the second number (N) of columns (step 400). More specifically, as illustrated in FIG. 4B, as a result of interleaving the isolated antenna elements with the non-isolated antenna elements, each of the isolated antenna elements is disposed adjacent to a respective one or two of the non-isolated antenna elements in each of the first number (M) of rows and each of the second number (N) of columns (step 400a). Further according to FIG. 4B, each of the non-isolated antenna elements is disposed adjacent to a respective one or two of the isolated antenna elements in each of the first number (M) of rows and each of the second number (N) of columns (step 400b).

The method also includes coupling a plurality of antenna isolators to the plurality of isolated antenna elements in the antenna array (step 402).

The method also includes coupling each of the plurality of non-isolated amplifier circuits 208 to a respective one of the non-isolated antenna elements in the antenna array 202 (step 404).

Figure 4C:
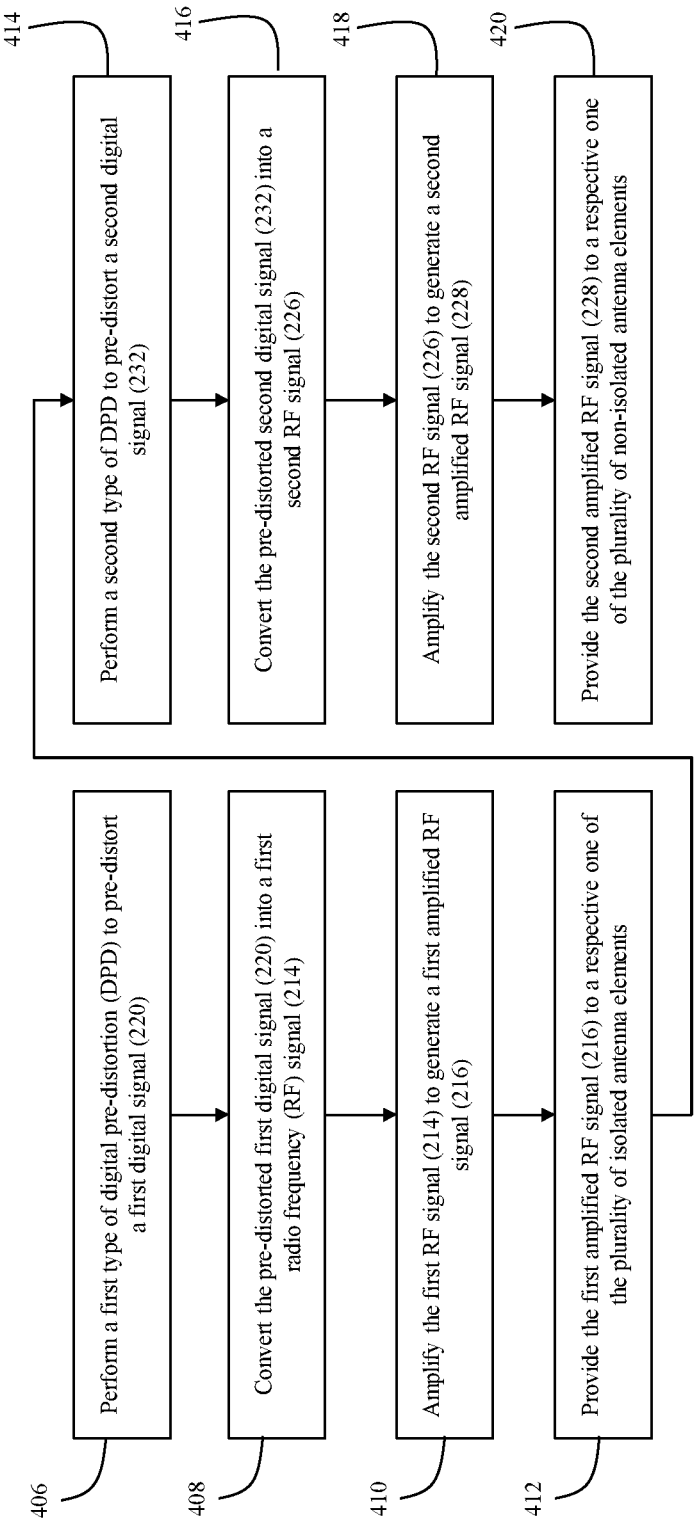
FIG. 4C is a flowchart illustrating an exemplary method for operating the radio node of FIG. 2A.

FIG. 4C is a flowchart illustrating an exemplary method for operating the radio node 200 of FIG. 2A. The method includes performing a first type of DPD to pre-distort the first digital signal 220 (step 406). In a non-limiting example, the first type of DPD can be a single-input single-output (SISO) DPD, such as the conventional DPD performed by the conventional DPD circuit 110 in FIG. 1A. The method also includes converting the pre-distorted first digital signal 220 into the first RF signal 214 (step 408). The method also includes amplifying the first RF signal 214 to generate the first amplified RF signal 216 (step 410). The method also includes providing the first amplified RF signal 216 to a respective one of the plurality of isolated antenna elements 204(2), 204(4), 204(6), 204(8) in the antenna array 202 (step 412).

The method includes performing a second type of DPD to pre-distort the second digital signal 232 (step 414). In a non-limiting example, the second type of DPD can be the simplified DI-PA DPD as described in FIG. 2A. The method also includes converting the pre-distorted second digital signal 232 into the second RF signal 226 (step 416). The method also includes amplifying the second RF signal 226 to generate the second amplified RF signal 228 (step 418). The method also includes providing the second amplified RF signal 228 to a respective one of the plurality of non-isolated antenna elements 204(1), 204(3), 204(5), 204(7), 204(9) in the antenna array 202 (step 420). The interleaved antenna configuration as described above can bring noticeable benefits over the existing isolator-protected antenna array configuration of FIG. 1A and the existing isolator-free antenna array configuration of FIG. 1B. In this regard, Table 1 below presents a summary of simulation findings.

TABLE 1

| | ACLR [dBc] | | | Effective | | # Isolator |
|---|---|---|---|---|---|---|
| | Antenna array #1 | Antenna array #2 | Antenna array #3 | #DPD coef. | # DPD coef. | (array size of L antennas) |
| Isolator-Protected | | −52.3 | | | 12 | L |
| Isolator-Free | −48.2 | −46.2 | −45.1 | 21 | 21*4 → 84 | 0 |
| Interleaved | [−52.3, −51.2] | [−52.3, −50.8] | [−52.3, −50.2] | 12, 21 | 16.5 | ½ L |

Notably, under the interleaved antenna configuration, the ACLR may vary in a range. For example, the ACLR of Antenna array #1 can vary between −52.3 dBc and 51.2 dBc. This is because different antenna elements in an antenna array may experience different coupling as a result of respective physical location in the antenna array. It should also be noted that the simulations are performed based on the following assumptions:

i. Same power amplifier is used for all simulations.
 ii. In the case of an isolator-protected antenna array configuration, the same ACLR is achievable for all antenna arrays as coupling plays no role. This also applies to the isolated antenna paths in the interleaved antenna array configuration.
 iii. Effective number of DPD coefficients for the number of iterations needed to converge in the DPD coefficient estimation process, which is found to be four (4) for DI-PA DPD in the case of isolator-free antenna array configuration and one (1) in the case of isolator-protected antenna array configuration and interleaved antenna array configuration.
 iv. In case the ACLR threshold is set to be −50 dBc (e.g., −45 dBc for mid-band (e.g., sub-6 GHz) transmitters as set by 3GPP plus a +5 dB margin for noise and other effect), it may be concluded that the isolator-free antenna array configuration is not capable of meeting the ACLR threshold.

Figure 5:
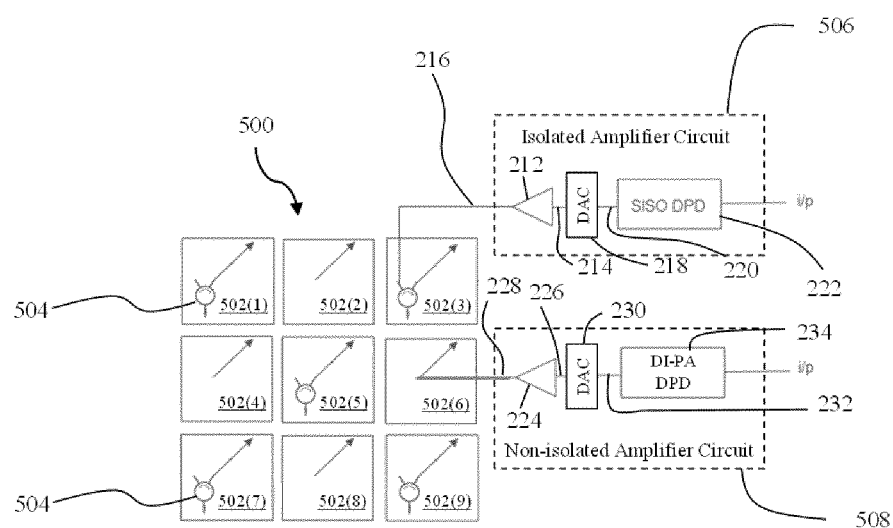
FIG. 5 is a schematic diagram of an exemplary antenna array having a different polarization from the antenna array in FIG. 2A and configured according to the interleaved configuration of the present disclosure.

In a non-limiting example, the antenna elements 204(1)-204(9) in the antenna array 202 are each configured to radiate in a polarization (e.g., horizontal or vertical). However, in some implementations, it may be desirable for the radio node 200 to be able to radiate in more than one polarization. In this regard, the radio node 200 can be configured to include a second antenna array to radiate in a second polarization that is different from the polarization of the antenna array 202. FIG. 5 is a schematic diagram of an exemplary antenna array 500 (also referred to as "second antenna array") having a different polarization from the antenna array 202 in FIG. 2A and configured according to the interleaved configuration of the present disclosure. Common elements between FIGS. 2A and 5 are shown therein with common element numbers and will not be re-described herein.

The antenna array 500 includes a plurality of non-isolated antenna elements 502(1), 502(3), 502(5), 502(7), 502(9) and a plurality of isolated antenna elements 502(2), 502(4), 502(6), 502(8) that are disposed based on the interleaved antenna array configuration as described in FIG. 2A. Similar to the isolated antenna elements 204(2), 204(4), 204(6), 204(8) in FIG. 2A, the isolated antenna elements 502(2), 502(4), 502(6), 502(8) are each coupled to and protected by a respective second antenna isolator 504.

Each of the isolated antenna elements in the antenna array 500 is coupled to a respective second isolated amplifier circuit 506. The second isolated amplifier circuit 506 may be identical to the isolated amplifier circuit 206 in FIG. 2A and thus will not be re-described herein for the sake of brevity. Likewise, each of the non-isolated antenna elements in the antenna array 500 is coupled to a respective second non-isolated amplifier circuit 508. The second non-isolated amplifier circuit 508 may be identical to the non-isolated amplifier circuit 208 in FIG. 2A and thus will not be re-described herein for the sake of brevity.

Figure 6A:
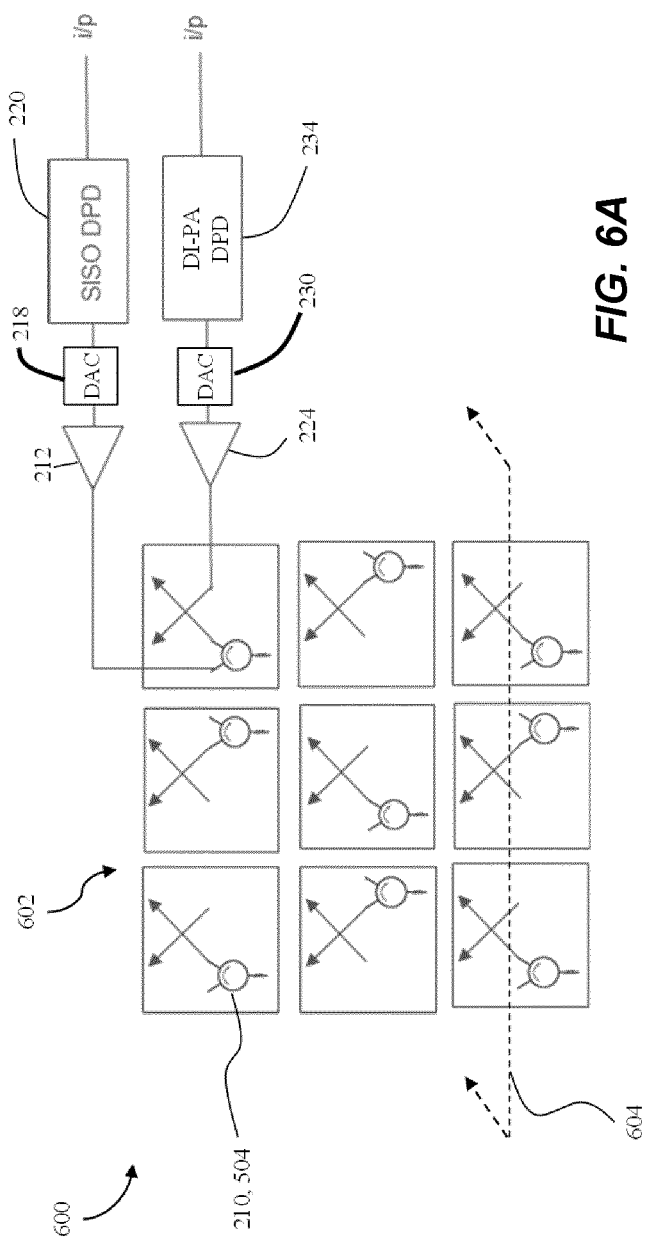
FIG. 6A is a schematic diagram of an exemplary radio node including a dual-polarization antenna array that is formed by stacking the antenna array in FIG. 2A and the antenna array in FIG. 5.

In a non-limiting example, the antenna array 200 of FIG. 2A and the second antenna array 500 of FIG. 5A can be stacked to form a dual-polarization antenna array. In this regard, FIG. 6A is a schematic diagram of an exemplary radio node 600 including a dual-polarization antenna array 602 that is formed by stacking the antenna array 202 in FIG. 2A and the antenna array 500 in FIG. 5. Common elements between FIGS. 2A, 5, and 6A are shown therein with common element numbers and will not be re-described herein. In a non-limiting example, the dual-polarization antenna array 602 can be configured to radiate in both horizontal and vertical polarizations.

Figure 6B:
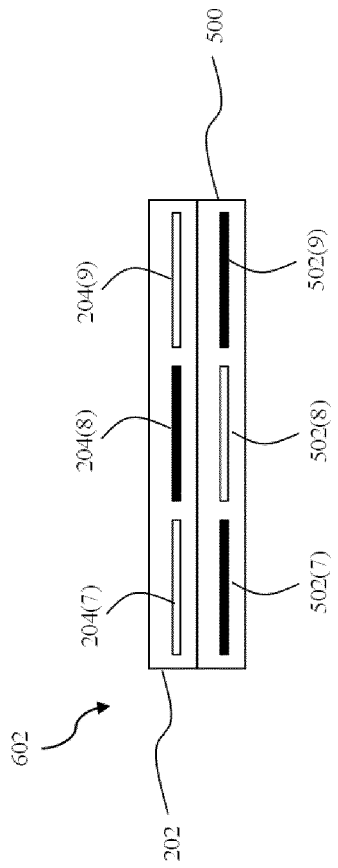
FIG. 6B is an exemplary cross-section view of the dual-polarization antenna array of FIG. 6A.

FIG. 6B is an exemplary cross-section view of the dual-polarization antenna array 602 along a cross-section line 604 in FIG. 6A. Common elements between FIGS. 2A, 5, 6A, and 6B are shown therein with common element numbers and will not be re-described herein.

In a non-limiting example, the antenna array 202 and the second antenna array 500 are so configured to ensure that the non-isolated antenna element 204(8) in the antenna array 202 is stacked on the second non-isolated antenna element 502(8) in the second antenna array 600. Similarly, each of the non-isolated antenna elements 204(7), 204(9) in the antenna array 202 are stacked on respective second isolated antenna elements 502(7), 502(9) in the second antenna array 500.

FIG. 6C is a schematic diagram of an exemplary radio node 606 including a dual-polarization antenna array 608 that is formed by stacking two antenna arrays according to an alternative configuration. FIG. 6D is an exemplary cross-section view of the dual-polarization antenna array 608 along a cross-section line 610 in FIG. 6C. As shown in FIG. 6D, the dual-polarization antenna array 608 includes a first antenna array 612 stacked on a second antenna array 614. In one non-limiting example, each of the first antenna array 612 and the second antenna array 614 has an identical interleaved configuration as in the antenna array 202 of FIG. 2A but with different polarizations. In this regard, when the first antenna array 612 and the second antenna array 614 are stacked, each of the isolated antenna elements 204(8) in the first antenna array 612 is stacked on a respective one of the isolated antenna elements 204(8) in the second antenna array 614. Likewise, each of the non-isolated antenna elements 204(7), 204(9) in the first antenna array 612 is stacked on a respective one of the non-isolated antenna elements 204(7), 204(9) in the second antenna array 614.

Figure 7:
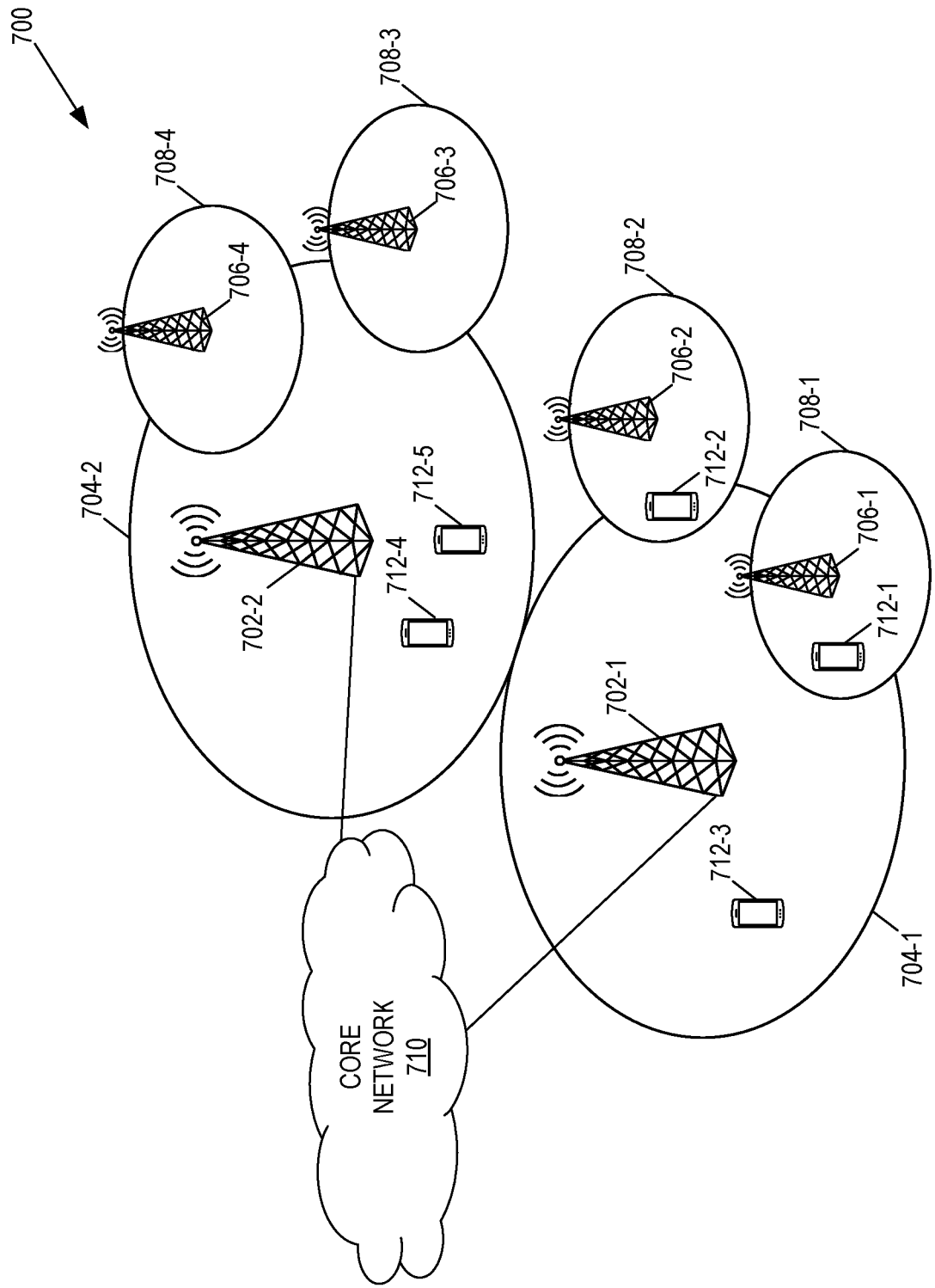
FIG. 7 illustrates one example of a cellular communications network in which embodiments of the present disclosure may be implemented to provide the radio nodes in FIGS. 2A, 2B, and 6A.

FIG. 7 illustrates one example of a cellular communications network 700 in which embodiments of the present disclosure may be implemented to provide the radio node 200 of FIG. 2A, the radio node 236 of FIG. 2B, and the radio node 600 of FIG. 6A. In the embodiments described herein, the cellular communications network 700 is a 5G NR network. In this example, the cellular communications network 700 includes base stations 702-1 and 702-2, which in LTE are referred to as eNBs and in 5G NR are referred to as gNBs, controlling corresponding macro cells 704-1 and 704-2. The base stations 702-1 and 702-2 are generally referred to herein collectively as base stations 702 and individually as base station 702. Likewise, the macro cells 704-1 and 704-2 are generally referred to herein collectively as macro cells 704 and individually as macro cell 704. The cellular communications network 700 may also include a number of low power nodes 706-1 through 706-4 controlling corresponding small cells 708-1 through 708-4. The low power nodes 706-1 through 706-4 can be small base stations (such as pico or femto base stations) or Remote Radio Heads (RRHs), or the like. Notably, while not illustrated, one or more of the small cells 708-1 through 708-4 may alternatively be provided by the base stations 702. The low power nodes 706-1 through 706-4 are generally referred to herein collectively as low power nodes 706 and individually as low power node 706. Likewise, the small cells 708-1 through 708-4 are generally referred to herein collectively as small cells 708 and individually as small cell 708. The base stations 702 (and optionally the low power nodes 706) are connected to a core network 710.

The base stations 702 and the low power nodes 706 provide service to wireless devices 712-1 through 712-5 in the corresponding cells 704 and 708. The wireless devices 712-1 through 712-5 are generally referred to herein collectively as wireless devices 712 and individually as wireless device 712. The wireless devices 712 are also sometimes referred to herein as UEs. In a non-limiting example, any of the base stations 702-1 and 702-2 and/or any of the low power nodes 706-1 through 706-4 can be configured to function as the radio node 200 in FIG. 2A, the radio node 236 of FIG. 2B, or the radio node 600 in FIG. 6A to enable the interleaved antenna array configuration as described in FIGS. 2A and 4.

Figure 8:
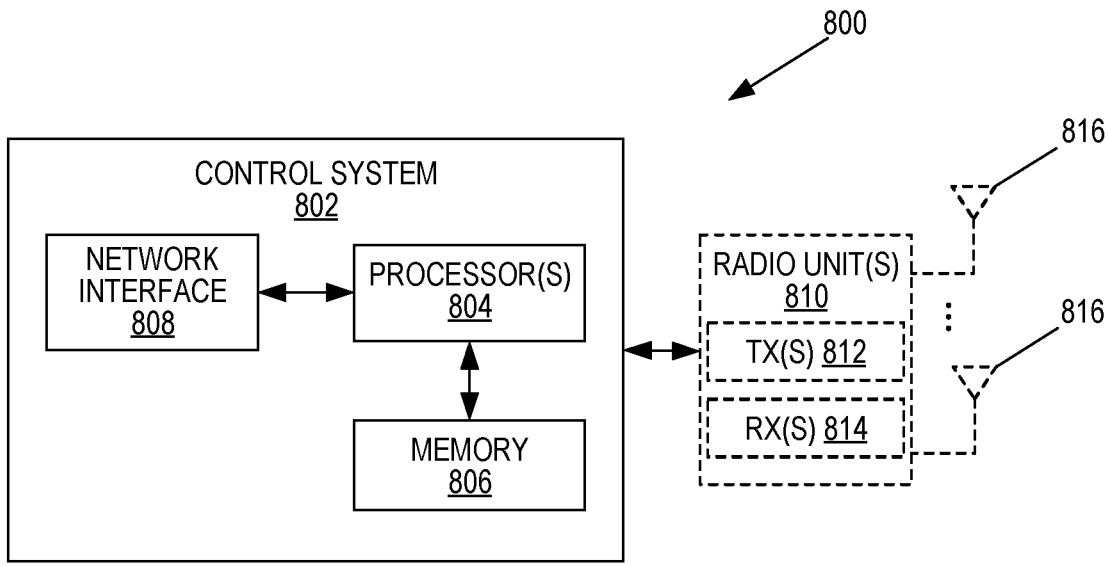
FIG. 8 is a schematic block diagram of a radio access node according to some embodiments of the present disclosure.

FIG. 8 is a schematic block diagram of a radio access node 800 according to some embodiments of the present disclosure. The radio access node 800 may be, for example, the radio node 200 of FIG. 2A, the radio node 236 of FIG. 2B, or the radio node 600 of FIG. 6A. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), a memory 806, and a network interface 808. The one or more processors 804 are also referred to herein as processing circuitry. In addition, the radio access node 800 includes one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of the radio access node 800 as described herein. In some embodiments, the function(s) are implemented in software that is stored, e.g., in the memory 806 and executed by the one or more processors 804.

Figure 9:
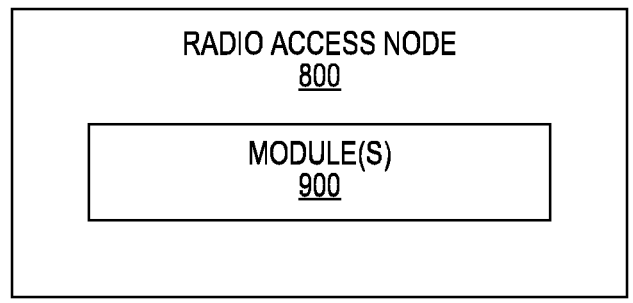
FIG. 9 is a schematic block diagram of the radio access node of FIG. 8 according to some other embodiments of the present disclosure.

FIG. 9 is a schematic block diagram of the radio access node 800 of FIG. 8 according to some other embodiments of the present disclosure. The radio access node 800 includes one or more modules 900, each of which is implemented in software. The module(s) 900 provides the functionality of the radio access node 800 described herein.

Figure 10:
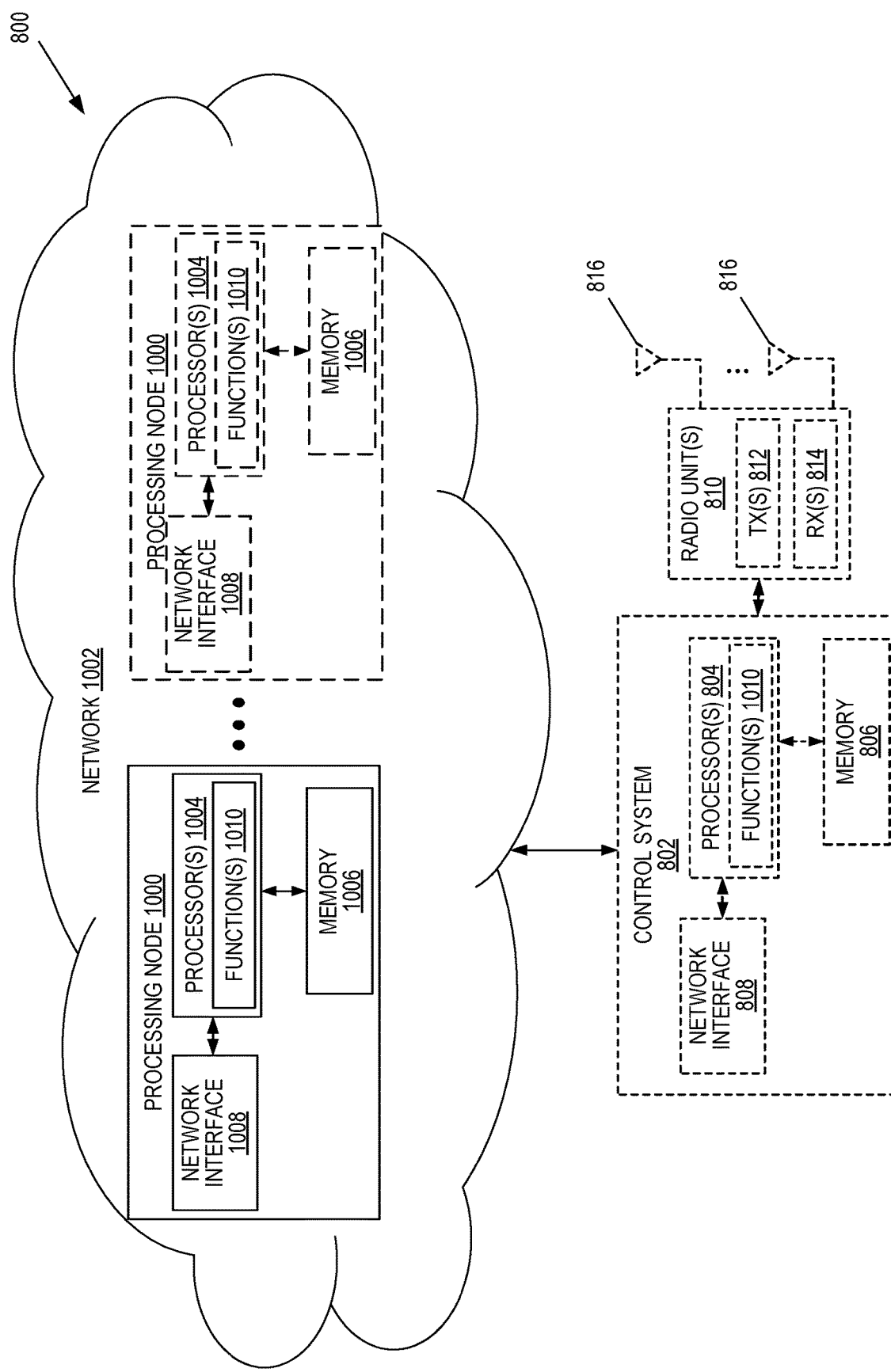
FIG. 10 is a schematic block diagram that illustrates a virtualized embodiment of the radio access node of FIG. 8 according to some embodiments of the present disclosure.

FIG. 10 is a schematic block diagram that illustrates a virtualized embodiment of the radio access node 800 of FIG. 8 according to some embodiments of the present disclosure. This discussion is equally applicable to other types of network nodes.

Further, other types of network nodes may have similar virtualized architectures. As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 includes the control system 802 that includes the one or more processors 804 (e.g., CPUs, ASICs, FPGAs, and/or the like), the memory 806, the network interface 808, and the one or more radio units 810 that each include the one or more transmitters 812 and the one or more receivers 814 coupled to the one or more antennas 816, as described above. The control system 802 is connected to the radio unit(s) 810 via, for example, an optical cable or the like. The control system 802 is connected to one or more processing nodes 1000 coupled to or included as part of a network(s) 1002 via the network interface 808. Each processing node 1000 includes one or more processors 1004 (e.g., CPUs, ASICs, FPGAs, and/or the like), a memory 1006, and a network interface 1008.

In this example, functions 1010 of the radio access node 800 described herein are implemented at the one or more processing nodes 1000 or distributed across the control system 802 and the one or more processing nodes 1000 in any desired manner. In some particular embodiments, some or all of the functions 1010 of the radio access node 800 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 802 is used in order to carry out at least some of the desired functions 1010. Notably, in some embodiments, the control system 802 may not be included, in which case the radio unit(s) 810 communicates directly with the processing node(s) 1000 via an appropriate network interface(s).

In some embodiments, a computer program including instructions which, when executed by at least one processor, cause the at least one processor to carry out the functionality of the radio access node 800 or a node (e.g., a processing node 1000) implementing one or more of the functions 1010 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
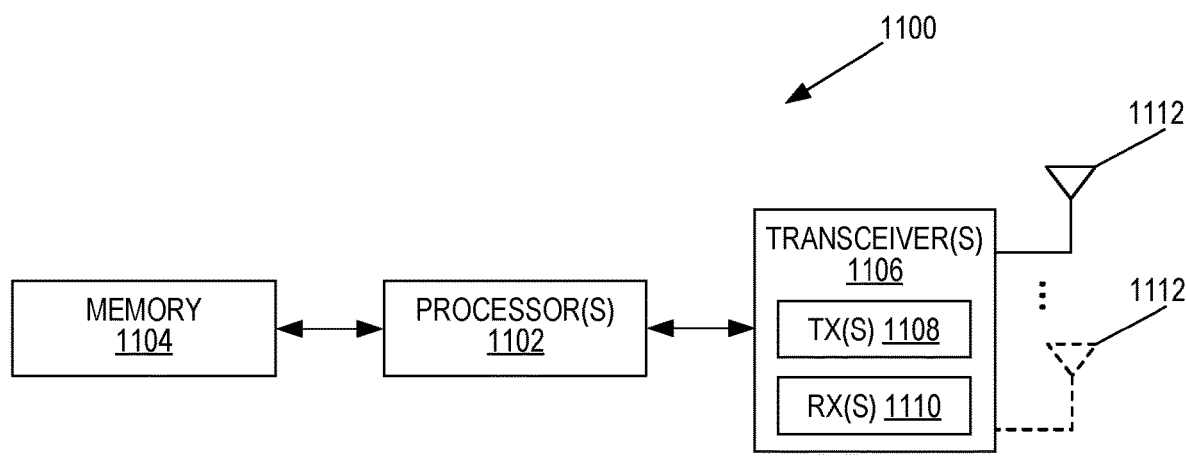
FIG. 11 is a schematic block diagram of a UE according to some embodiments of the present disclosure.

FIG. 11 is a schematic block diagram of a UE 1100 according to some embodiments of the present disclosure. As illustrated, the UE 1100 includes one or more processors 1102 (e.g., CPUs, ASICs, FPGAs, and/or the like), a memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1104, as will be appreciated by one of ordinary skill in the art. The processors 1104 are also referred to herein as processing circuitry. The transceivers 1106 are also referred to herein as radio circuitry. In some embodiments, the functionality of the UE 1100 described above may be fully or partially implemented in software that is, e.g., stored in the memory 1104 and executed by the processor(s) 1102. Note that the UE 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the UE 1100 and/or allowing output of information from the UE 1100), a power supply (e.g., a battery and associated power circuitry), etc.

In some embodiments, a computer program is provided including instructions which, when executed by at least one processor, cause the at least one processor to carry out the functionality of the UE 1100 according to any of the embodiments described herein. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
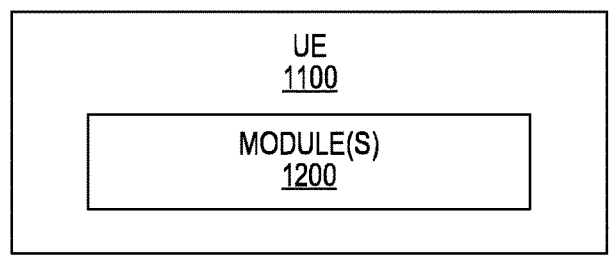
FIG. 12 is a schematic block diagram of the UE of FIG. 11 according to some other embodiments of the present disclosure.

FIG. 12 is a schematic block diagram of the UE 1100 of FIG. 11 according to some other embodiments of the present disclosure. The UE 1100 includes one or more modules 1200, each of which is implemented in software. The module(s) 1200 provides the functionality of the UE 1200 described herein.

At least some of the following abbreviations may be used in this disclosure. If there is an inconsistency between abbreviations, preference should be given to how it is used above. If listed multiple times below, the first listing should be preferred over any subsequent listing(s).

3G Third Generation
    3GPP Third Generation Partnership Project
    4G Fourth Generation
    5G Fifth Generation
    5G-NR Fifth Generation-New Radio
    ACLR Adjacent Channel Leakage Ratio
    AMF Access and Mobility Function
    ASIC Application Specific Integrated Circuit
    AUSF Authentication Server Function
    BS Base Station
    CPU Central Processing Unit
    DI-PA Dual-Input Power Amplifier
    DPD Digital Predistortion
    eNB Enhanced or Evolved Node B
    FPGA Field Programmable Gate Array
    gNB New Radio Base Station gNB-DU New Radio Base Station Distributed Unit
HSS Home Subscriber Server
IoT Internet of Things
LTE Long Term Evolution
MIMO Multiple Input Multiple Output
MME Mobility Management Entity
mm-wave Millimeter Wave
MTC Machine Type Communication
MU Multi-User
NEF Network Exposure Function
NF Network Function
NR New Radio
NRF Network Function Repository Function
NSSF Network Slice Selection Function
PC Personal Computer
PCF Policy Control Function
P-GW Packet Data Network Gateway
RAN Radio Access Network
RAT Radio Access Technology
RF Radio Frequency
SCEF Service Capability Exposure Function
SISO Single Input Single Output
SMF Session Management Function
TDD Time Division Duplexing
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A radio node, comprising:
an antenna array comprising:
  a plurality of isolated antenna elements and a plurality of non-isolated antenna elements disposed in a first number of rows and a second number of columns, wherein the plurality of isolated antenna elements and the plurality of non-isolated antenna elements are interleaved in each of the first number of rows and each of the second number of columns; and
  a plurality of antenna isolators each coupled to a respective one of the plurality of isolated antenna elements; and
  a plurality of non-isolated amplifier circuits each coupled to a respective one of the plurality of non-isolated antenna elements in the antenna array.

2. The radio node of claim 1, wherein:
each of the plurality of isolated antenna elements is adjacent to a respective one or two of the plurality of non-isolated antenna elements in each of the first number of rows and each of the second number of columns; and
each of the plurality of non-isolated antenna elements is adjacent to a respective one or two of the plurality of isolated antenna elements in each of the first number of rows and each of the second number of columns.

3. The radio node of claim 1, further comprising a plurality of isolated amplifier circuits each coupled to a respective one of the plurality of antenna isolators, wherein the plurality of isolated amplifier circuits each comprises:
an isolated power amplifier coupled to the respective one of the plurality of antenna isolators and adapted to amplify a respective radio frequency (RF) signal to generate a respective amplified RF signal for radiation via the respective one of the plurality of isolated antenna elements;
a digital-to-analog converter (DAC) coupled to the isolated power amplifier and adapted to receive and convert a respective digital signal into the respective RF signal; and
a digital pre-distortion (DPD) circuit coupled to the DAC and adapted to pre-distort the respective digital signal to reduce nonlinearity distortion in the respective amplified RF signal.

4. The radio node of claim 1, wherein the plurality of non-isolated amplifier circuits each comprises:
a non-isolated power amplifier coupled to the respective one of the plurality of non-isolated antenna elements, the non-isolated power amplifier adapted to amplify a respective RF signal to generate a respective amplified RF signal for radiation via the respective one of the plurality of non-isolated antenna elements;
a DAC coupled to the non-isolated power amplifier and adapted to receive and convert a respective digital signal into the respective RF signal; and
a simplified DPD circuit coupled to the DAC and adapted to pre-distort the respective digital signal based on a simplified dual-input power amplifier (DI-PA) DPD algorithm to reduce nonlinearity distortion in the respective amplified RF signal.

5. The radio node of claim 4, wherein the antenna array is adapted to not include an antenna isolator between the non-isolated power amplifier and the respective one of the plurality of non-isolated antenna elements.

6. The radio node of claim 4, wherein the simplified DI-PA DPD algorithm is determined for each of the plurality of non-isolated power amplifiers based on a respective indirect DI-PA input that is a function of up to four isolated antenna elements immediately surrounding a respective one of the plurality of non-isolated antenna elements coupled to the non-isolated power amplifier.

7. The radio node of claim 1, further comprising:
a second antenna array, the second antenna array comprising a plurality of second isolated antenna elements and a plurality of second non-isolated antenna elements disposed in the first number of rows and the second number of columns, wherein the plurality of second isolated antenna elements and the plurality of second non-isolated antenna elements are interleaved in each of the first number of rows and each of the second number of columns;
a plurality of second isolated amplifier circuits each coupled to a respective one of the plurality of second isolated antenna elements in the second antenna array; and
a plurality of second non-isolated amplifier circuits each coupled to a respective one of the plurality of second non-isolated antenna elements in the second antenna array.

8. The radio node of claim 7, wherein:
each of the plurality of second isolated antenna elements is adjacent to a respective one or two of the plurality of second non-isolated antenna elements in each of the first number of rows and each of the second number of columns; and
each of the plurality of second non-isolated antenna elements is adjacent to a respective one or two of the plurality of second isolated antenna elements in each of the first number of rows and each of the second number of columns.

9. The radio node of claim 7, wherein the antenna array is stacked on the second antenna array, wherein:
    each of the plurality of isolated antenna elements in the antenna array is stacked on a respective one of the plurality of second non-isolated antenna elements in the second antenna array; and
    each of the plurality of non-isolated antenna elements in the antenna array is stacked on a respective one of the plurality of second isolated antenna elements in the second antenna array.

10. The radio node of claim 7, wherein the antenna array is stacked on the second antenna array, wherein:
    each of the plurality of isolated antenna elements in the antenna array is stacked on a respective one of the plurality of second isolated antenna elements in the second antenna array; and
    each of the plurality of non-isolated antenna elements in the antenna array is stacked on a respective one of the plurality of second non-isolated antenna elements in the second antenna array.

11. The radio node of claim 1, wherein:
    the plurality of isolated antenna circuits and the plurality of non-isolated antenna circuits in the antenna array are adapted to radiate in a first polarization; and
    the plurality of second isolated antenna circuits and the plurality of second non-isolated antenna circuits in the second antenna array are adapted to radiate in a second polarization different from the first polarization.

12. The radio node of claim 1 is adapted to operate as a base station in a radio network.

13. The radio node of claim 1 is adapted to operate as a wireless device in a radio network.

14. A method for configuring an antenna array in a radio node, comprising:
    disposing a plurality of isolated antenna elements and a plurality of non-isolated antenna elements in a first number of rows and a second number of columns of the antenna array such that the plurality of isolated antenna elements and the plurality of non-isolated antenna elements are interleaved in each of the first number of rows and each of the second number of columns;
    coupling a plurality of antenna isolators to the plurality of isolated antenna elements in the antenna array, respectively; and
    coupling each of a plurality of non-isolated amplifier circuits to a respective one of the plurality of non-isolated antenna elements in the antenna array.

15. A method for operating a radio node, the radio node comprising an antenna array that comprises a plurality of isolated antenna elements and a plurality of non-isolated antenna elements that are interleaved in each row and each column, the method comprising:
    performing a first type of digital pre-distortion (DPD) to pre-distort a first digital signal;
    converting the pre-distorted first digital signal into a first radio frequency (RF) signal;
    amplifying the first RF signal to generate a first amplified RF signal;
    providing the first amplified RF signal to a respective one of the plurality of isolated antenna elements;
    performing a second type of DPD to pre-distort a second digital signal;
    converting the pre-distorted second digital signal into a second RF signal;
    amplifying the second RF signal to generate a second amplified RF signal; and
    providing the second amplified RF signal to a respective one of the plurality of non-isolated antenna elements.

16. The method of claim 15, wherein the first type of DPD is a single-input single-output (SISO) DPD.

17. The method of claim 15, wherein the second type of DPD is a simplified dual-input power amplifier (DI-PA) DPD.

18. A radio node, comprising:
    an antenna array comprising a plurality of isolated sub-arrays and a plurality of non-isolated sub-arrays, wherein the plurality of isolated sub-arrays and the plurality of non-isolated antenna sub-arrays are interleaved;
    a plurality of antenna isolators each coupled to a respective one of the plurality of isolated sub-arrays;
    a plurality of isolated amplifier circuits each coupled to a respective antenna isolator among the plurality of antenna isolators; and
    a plurality of non-isolated amplifier circuits each coupled to a respective one of the plurality of non-isolated sub-arrays in the antenna array.

19. The radio node of claim 18, further comprising a plurality of radio frequency (RF) splitter/combiners each coupled to a respective one of the plurality of isolated sub-arrays and the plurality of non-isolated sub-arrays.

20. The radio node of claim 19, wherein:
    each of the isolated sub-arrays comprises a plurality of isolated antenna elements coupled to a respective one of the plurality of RF splitter/combiners;
    each of the non-isolated sub-arrays comprises a plurality of non-isolated antenna element coupled to a respective one of the plurality of RF splitter/combiners;
    each of the plurality of antenna isolators is coupled to the respective one of the plurality of isolated sub-arrays via a respective one of the plurality of RF splitter/combiners; and
    each of the plurality of non-isolated amplifier circuits is coupled to the respective one of the plurality of non-isolated sub-arrays via a respective one of the plurality of RF splitter/combiners.

* * * * *